April 25, 1944.  F. G. SILVA ET AL  2,347,372
AUTOMATIC FORMING MACHINE
Filed March 31, 1941  16 Sheets-Sheet 2
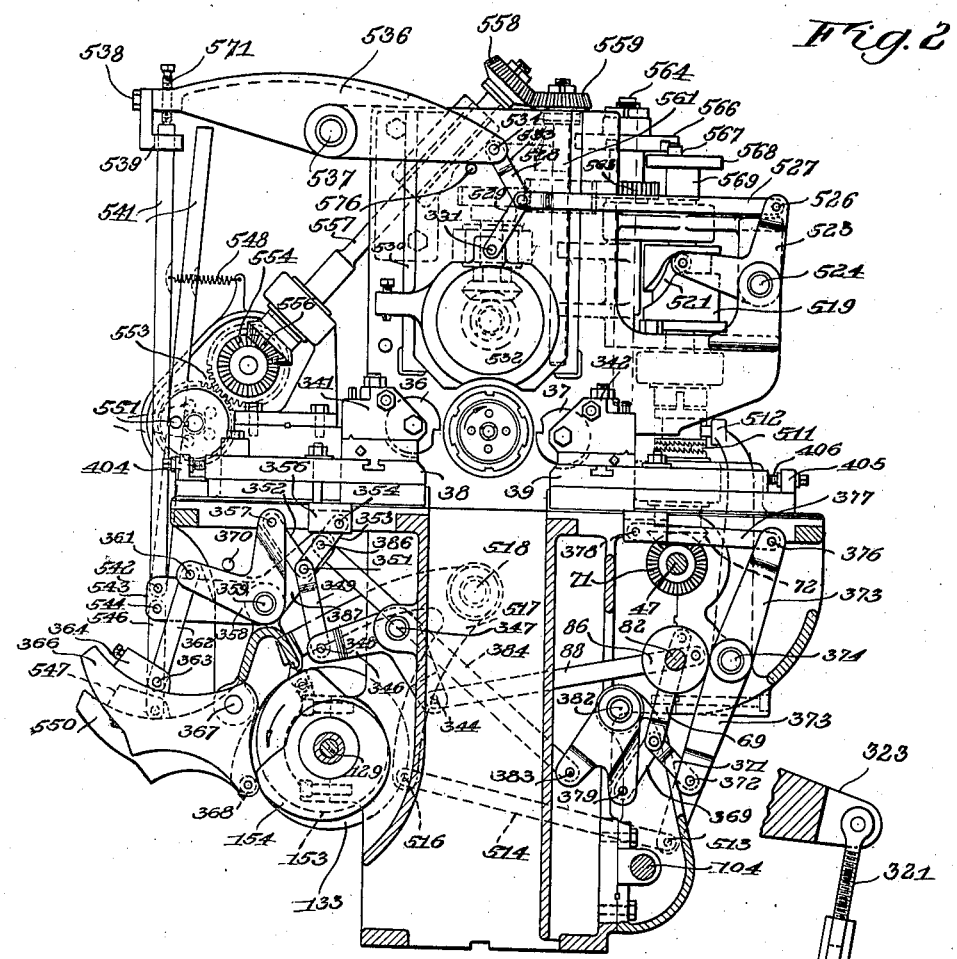
Fig. 2
Fig. 16
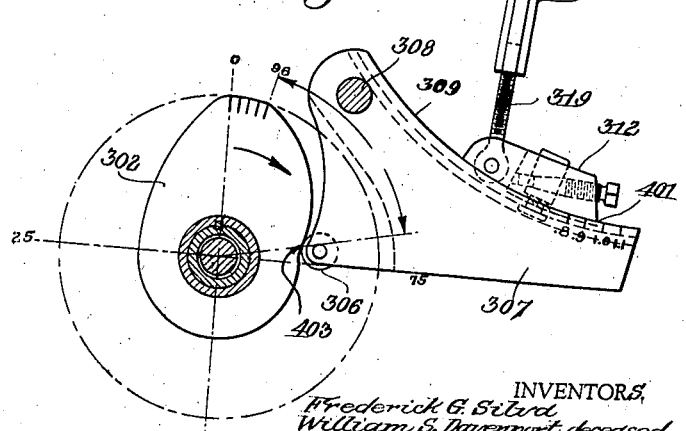
INVENTORS,
Frederick G. Silva
William S. Davenport, deceased
Edith E. Davenport, executrix
BY Cumpston & Shepard
their ATTORNEYS.

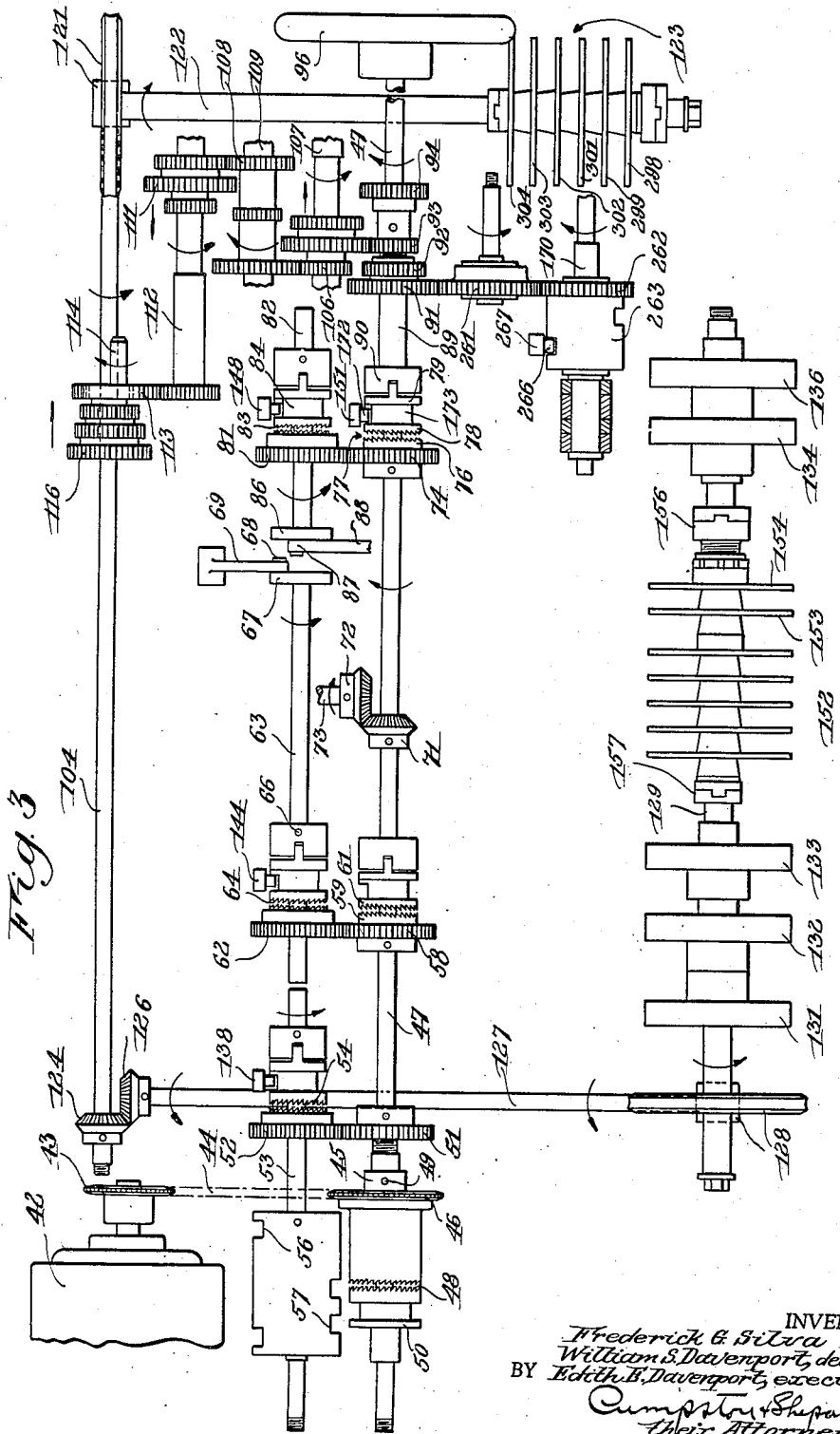

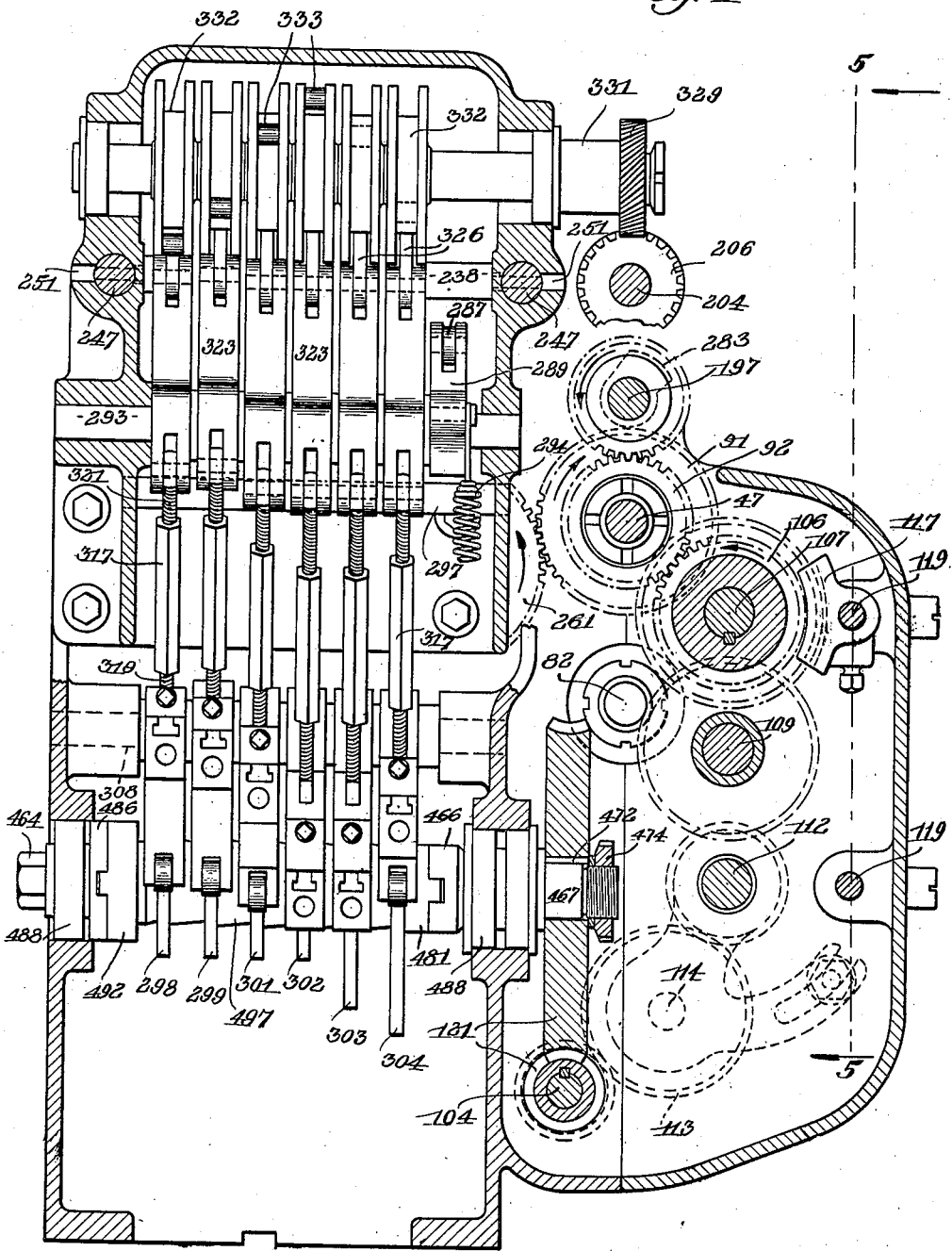

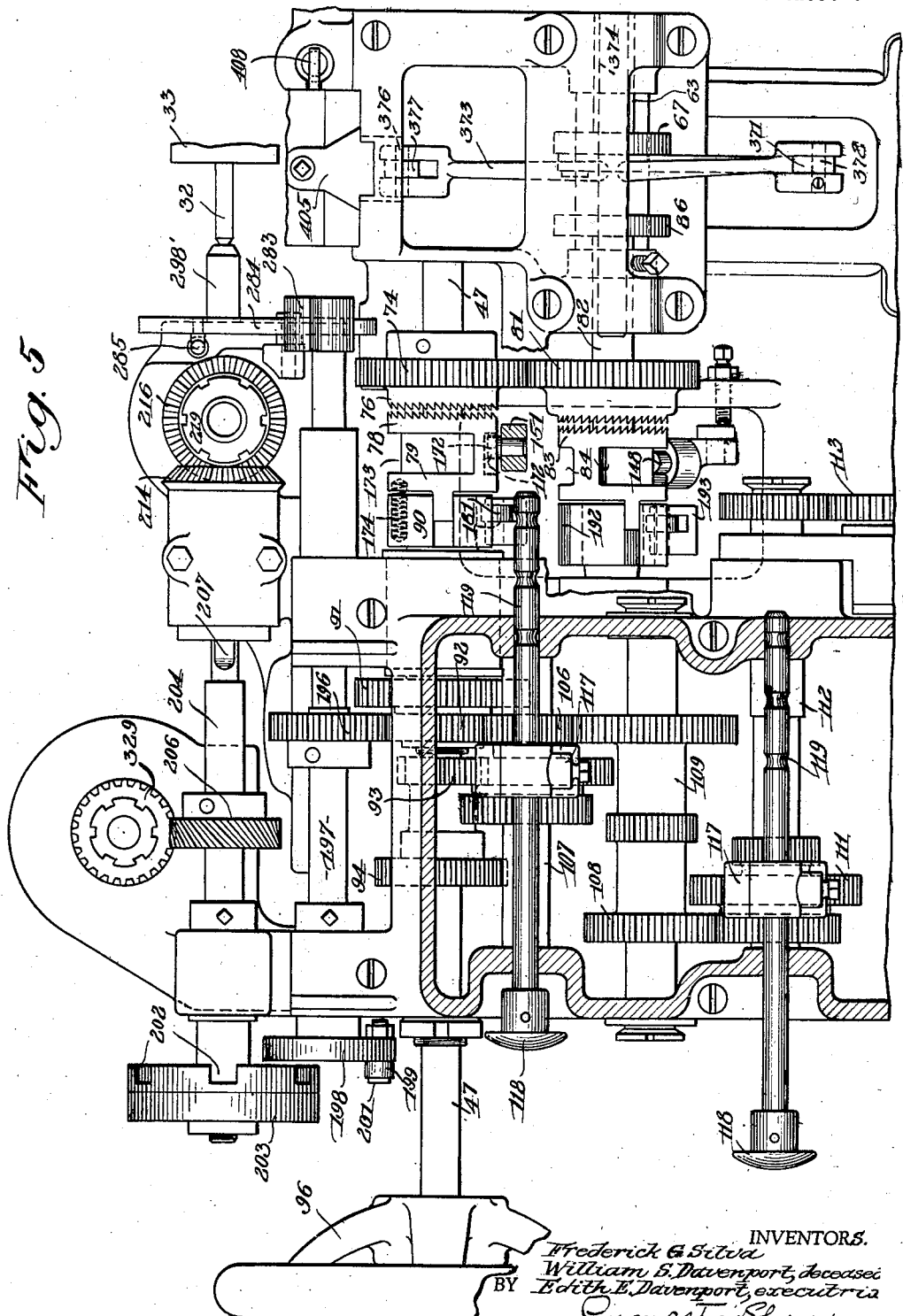

April 25, 1944.   F. G. SILVA ET AL   2,347,372
AUTOMATIC FORMING MACHINE
Filed March 31, 1941   16 Sheets-Sheet 7
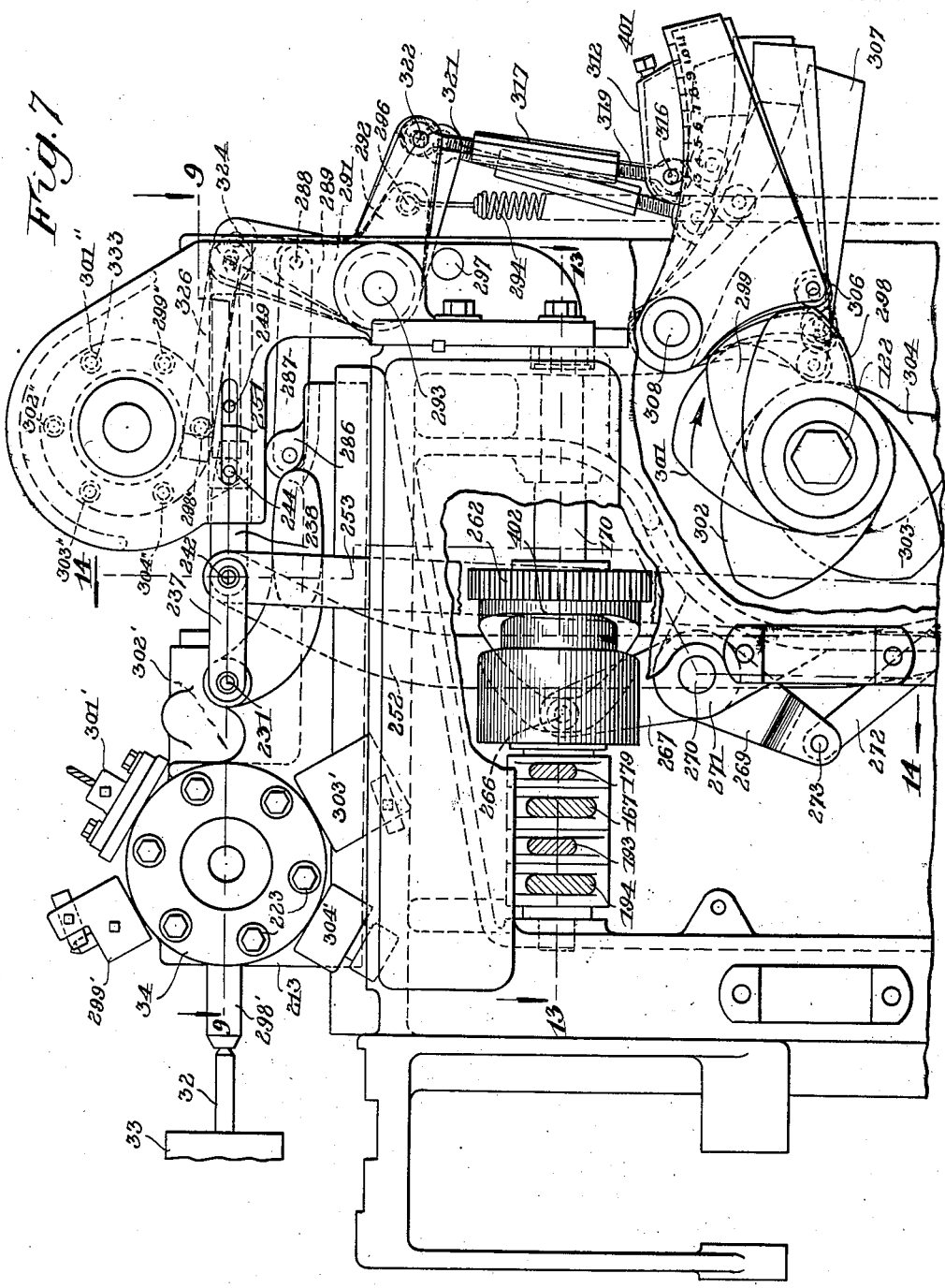
INVENTORS.
Frederick G. Silva
William S. Davenport, deceased
BY Edith E. Davenport, executrix
Cumpston & Shepard
Their Attorneys April 25, 1944.  F. G. SILVA ET AL  2,347,372
AUTOMATIC FORMING MACHINE
Filed March 31, 1941  16 Sheets-Sheet 8

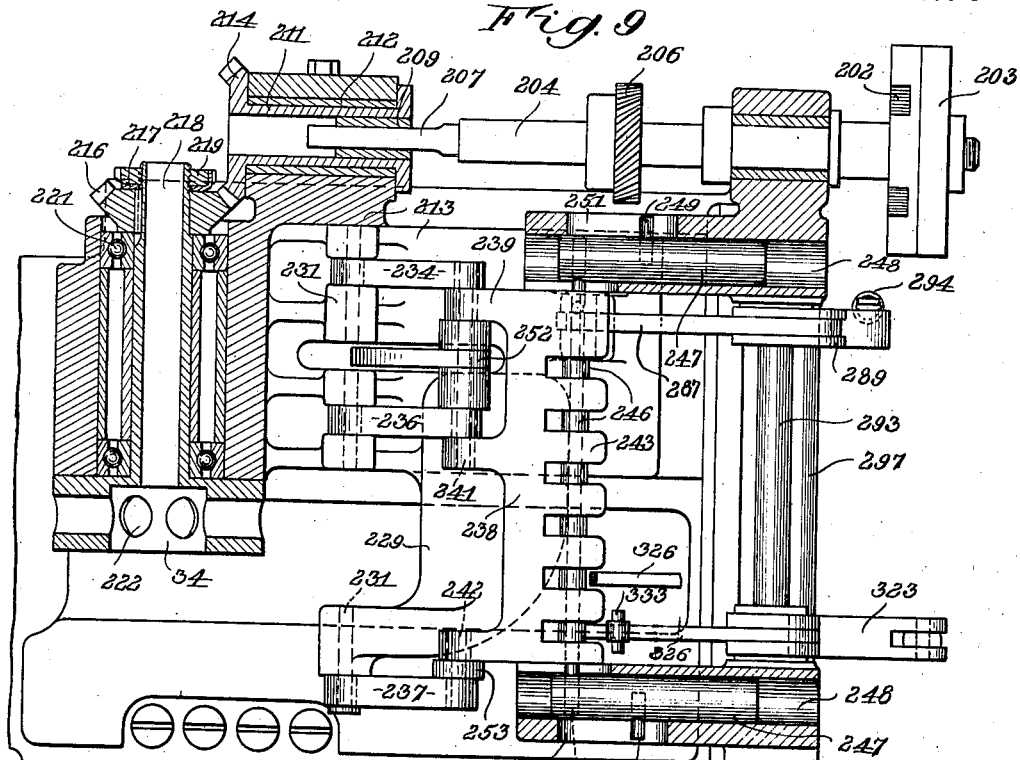
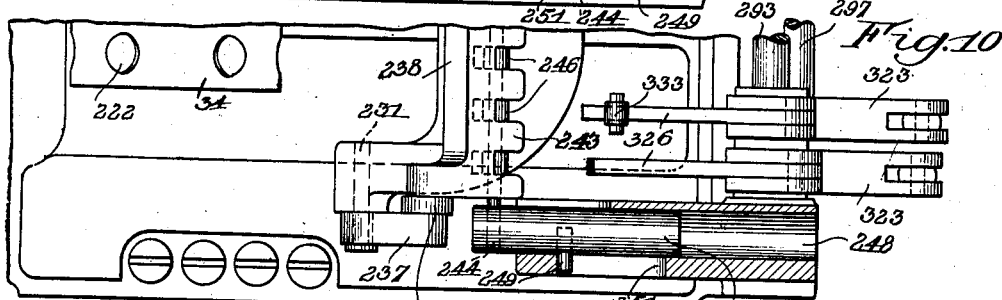
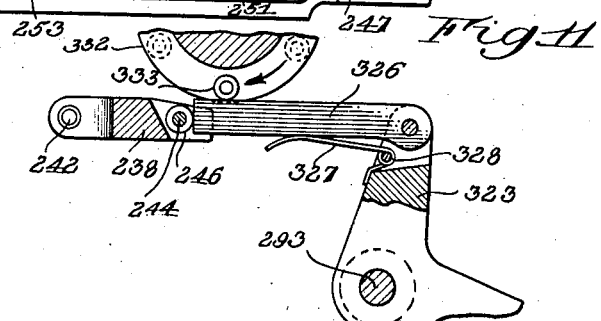

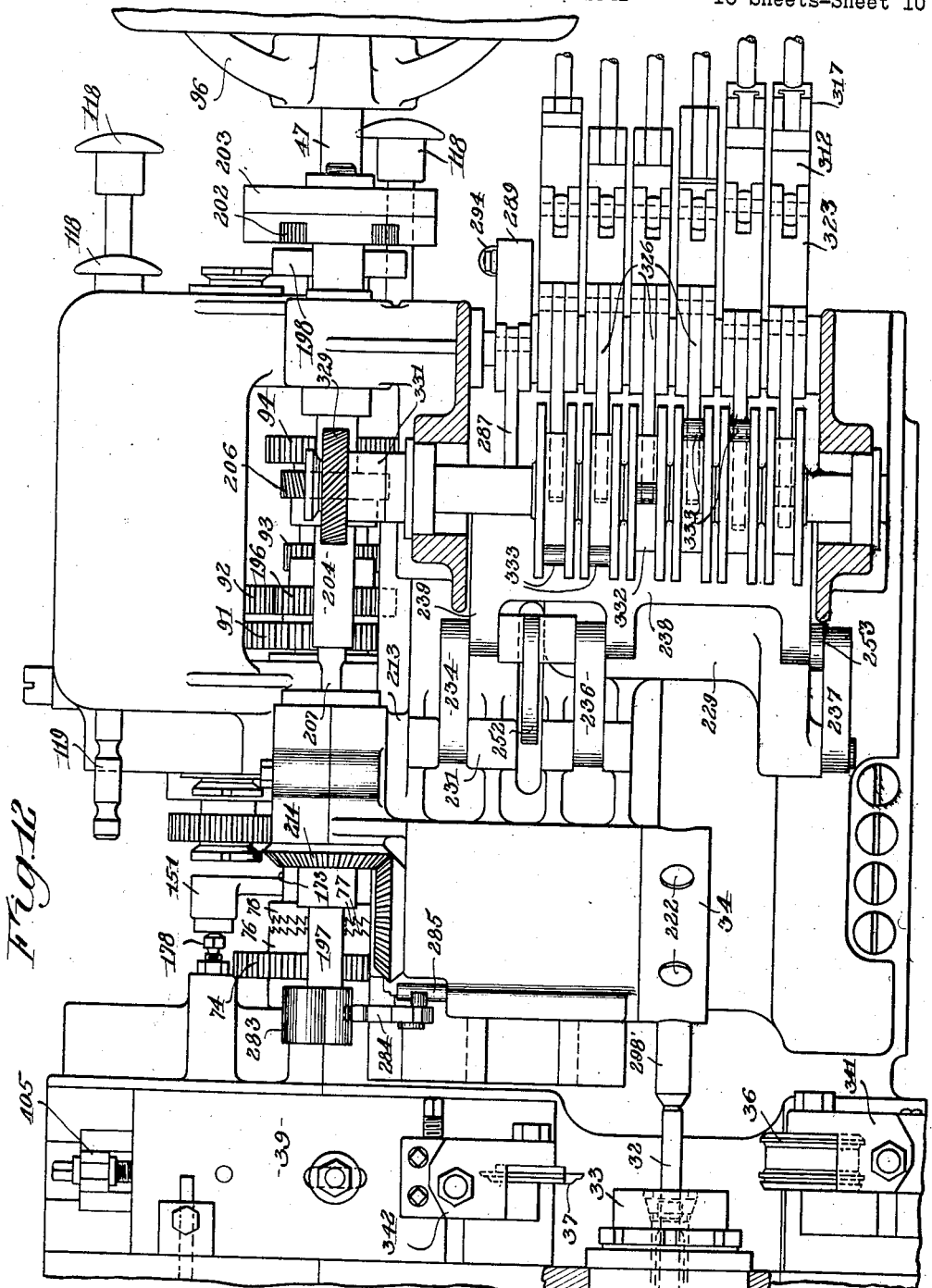

April 25, 1944.  F. G. SILVA ET AL  2,347,372
AUTOMATIC FORMING MACHINE
Filed March 31, 1941   16 Sheets-Sheet 11
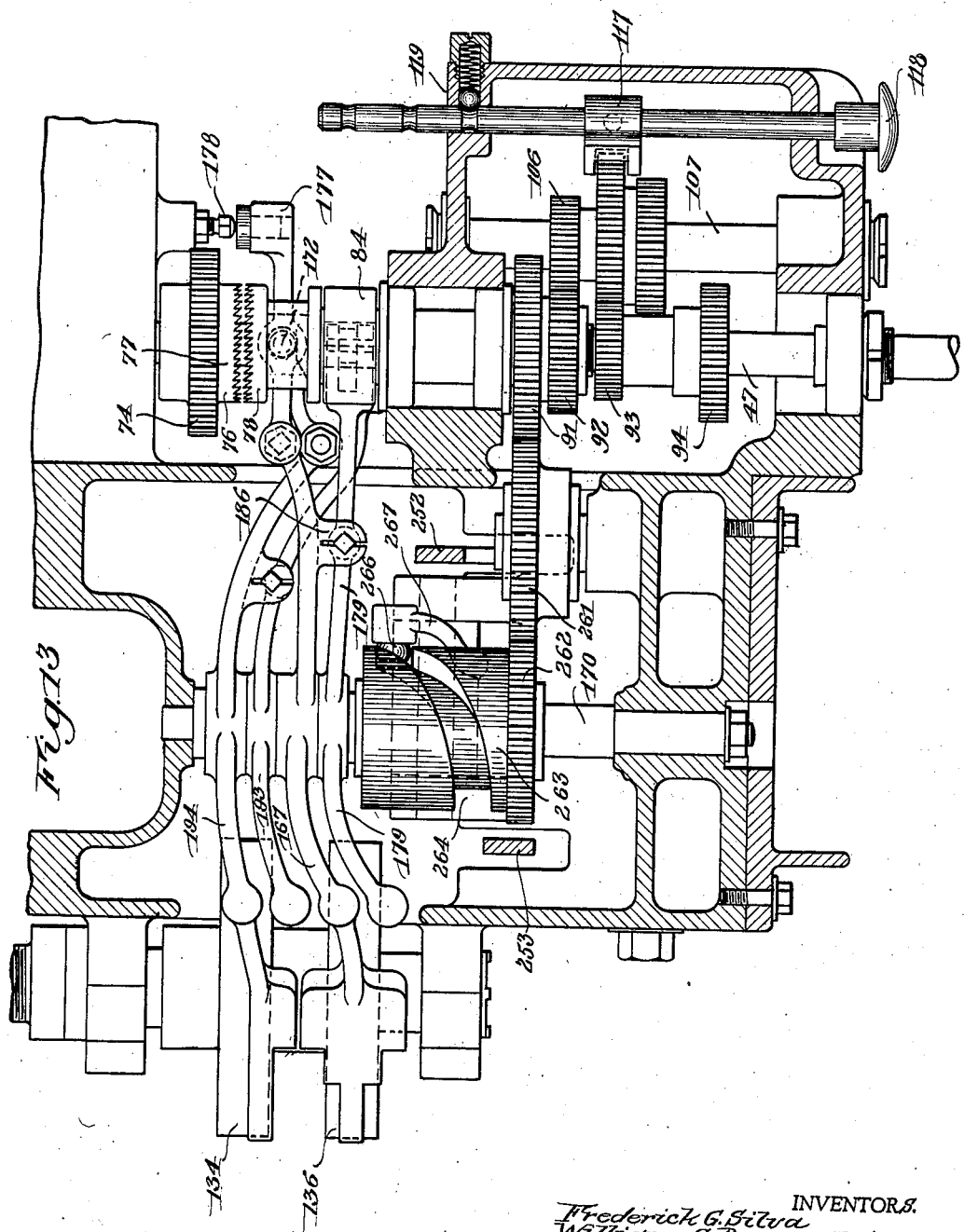
INVENTORS.
Frederick G. Silva
William S. Davenport, deceased
BY Edith E. Davenport, executrix
Cumpston & Shepard
their Attorneys April 25, 1944.  F. G. SILVA ET AL  2,347,372
AUTOMATIC FORMING MACHINE
Filed March 31, 1941  16 Sheets-Sheet 12
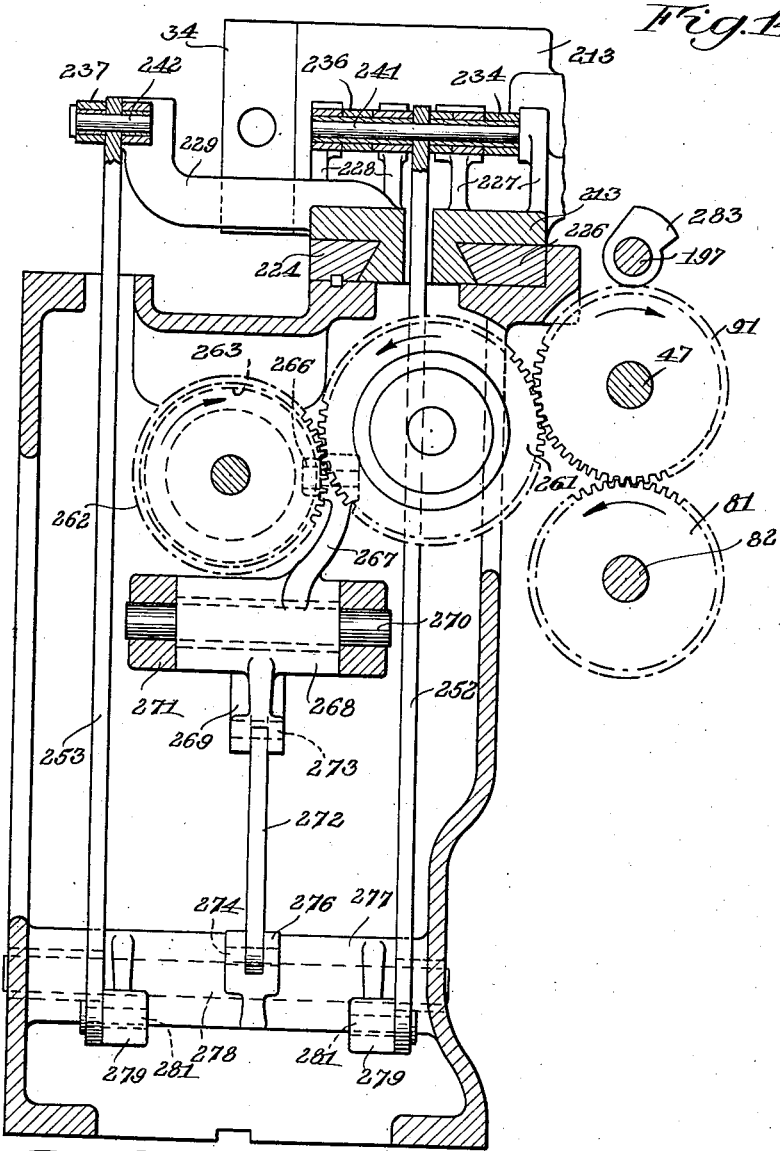
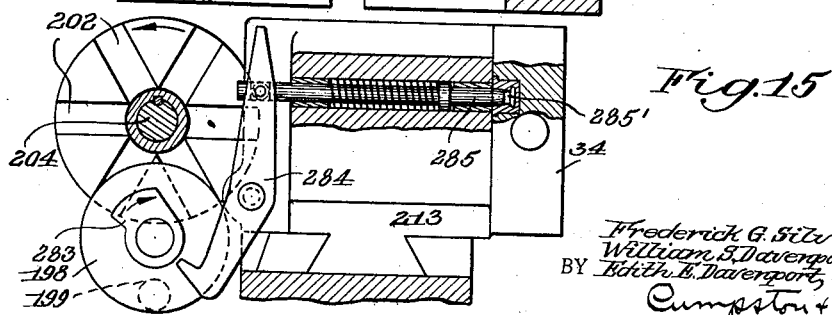
INVENTORS.
Frederick G. Silva
William S. Davenport, deceased
BY Edith E. Davenport, executrix
Cumpston & Shepard
their Attorneys

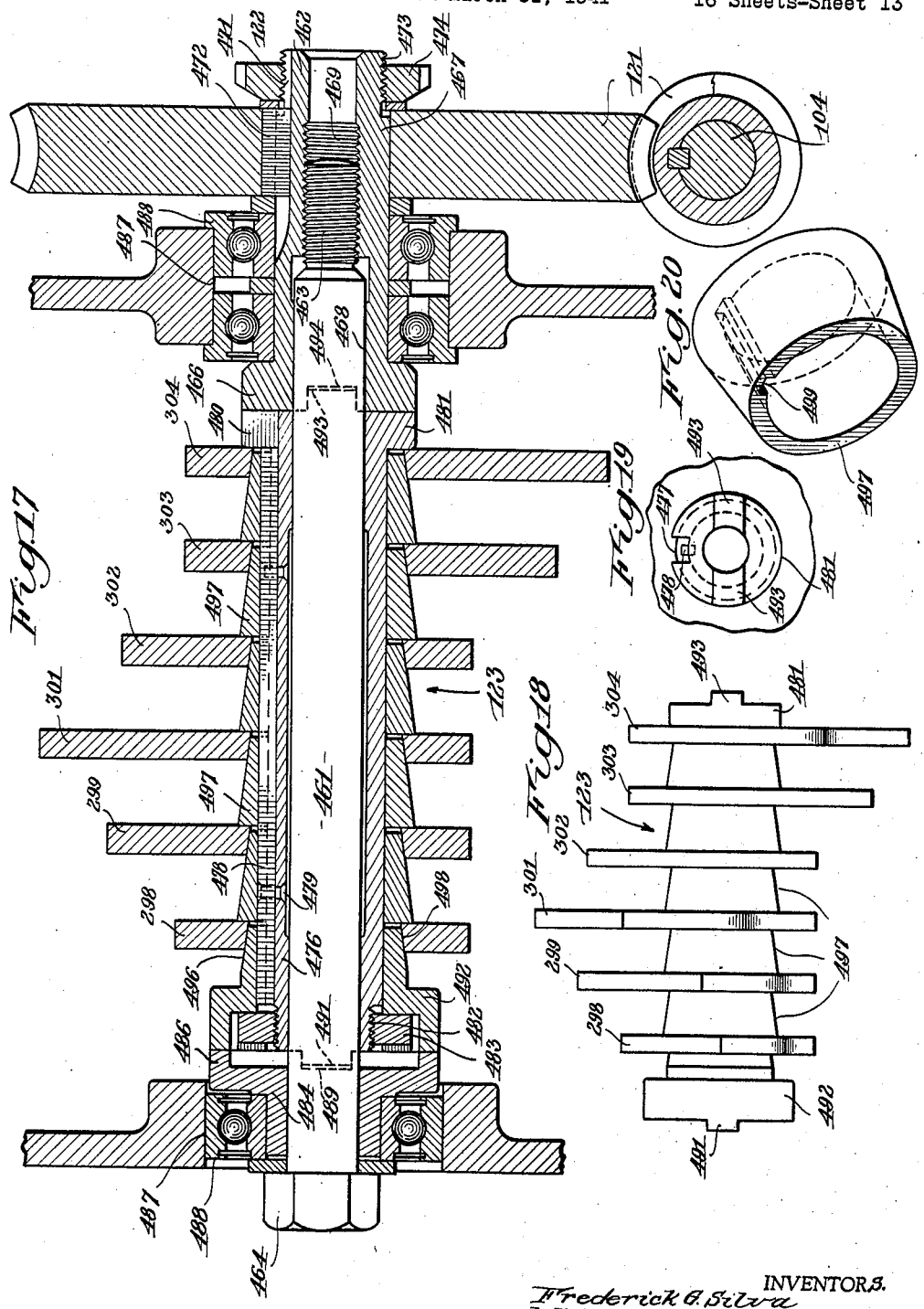

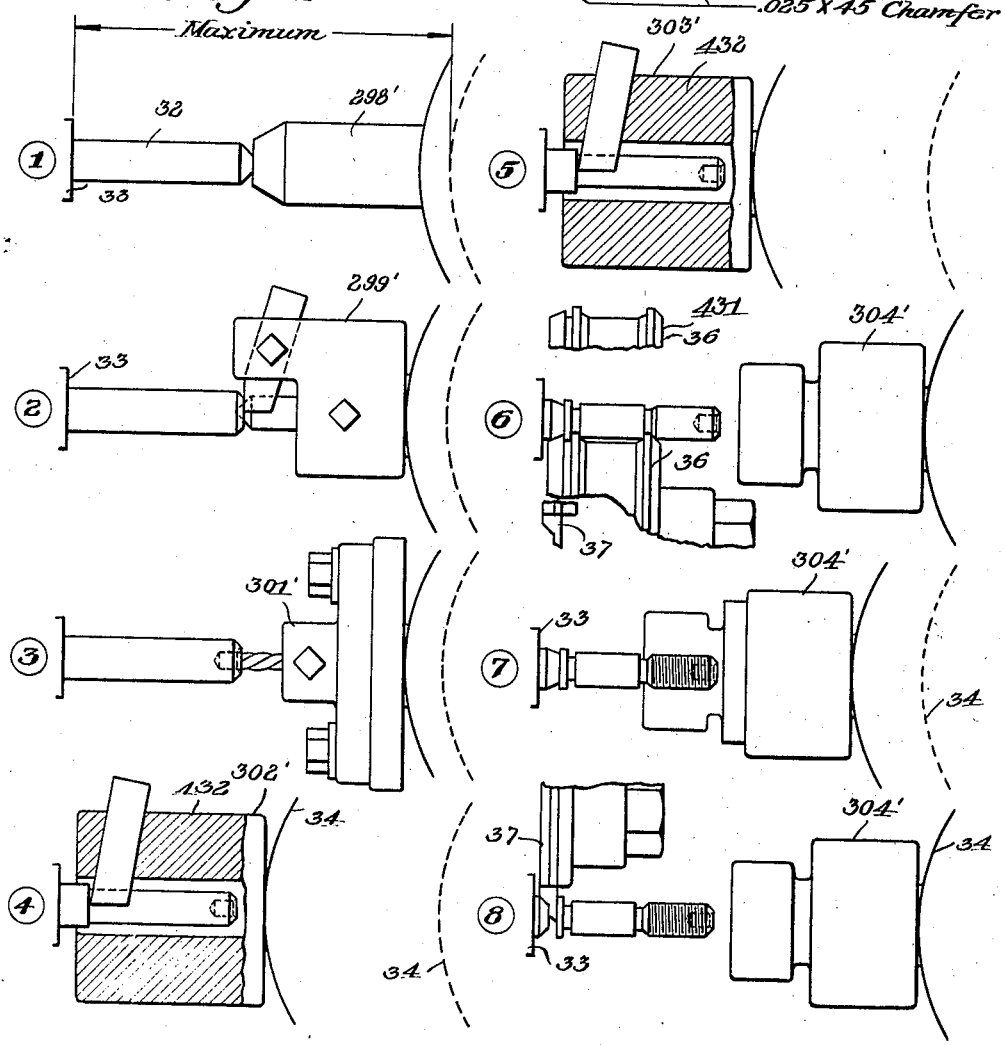

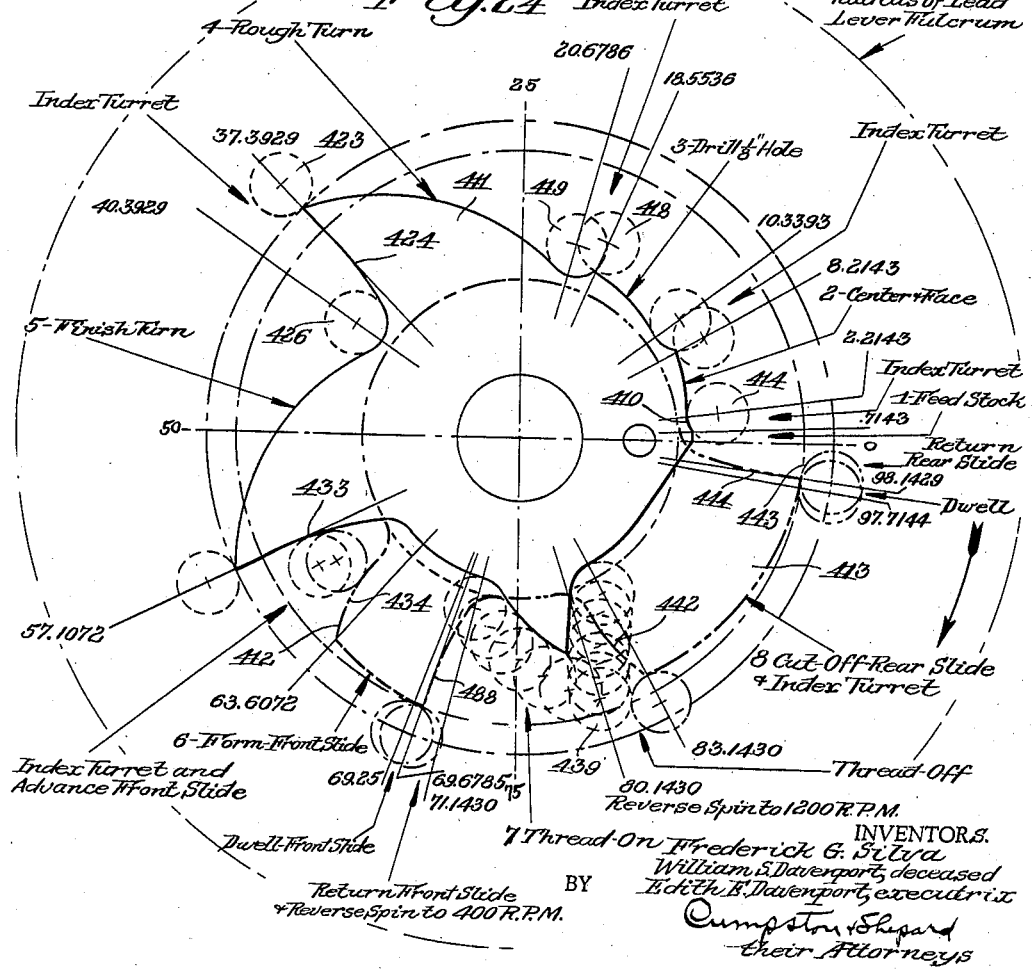

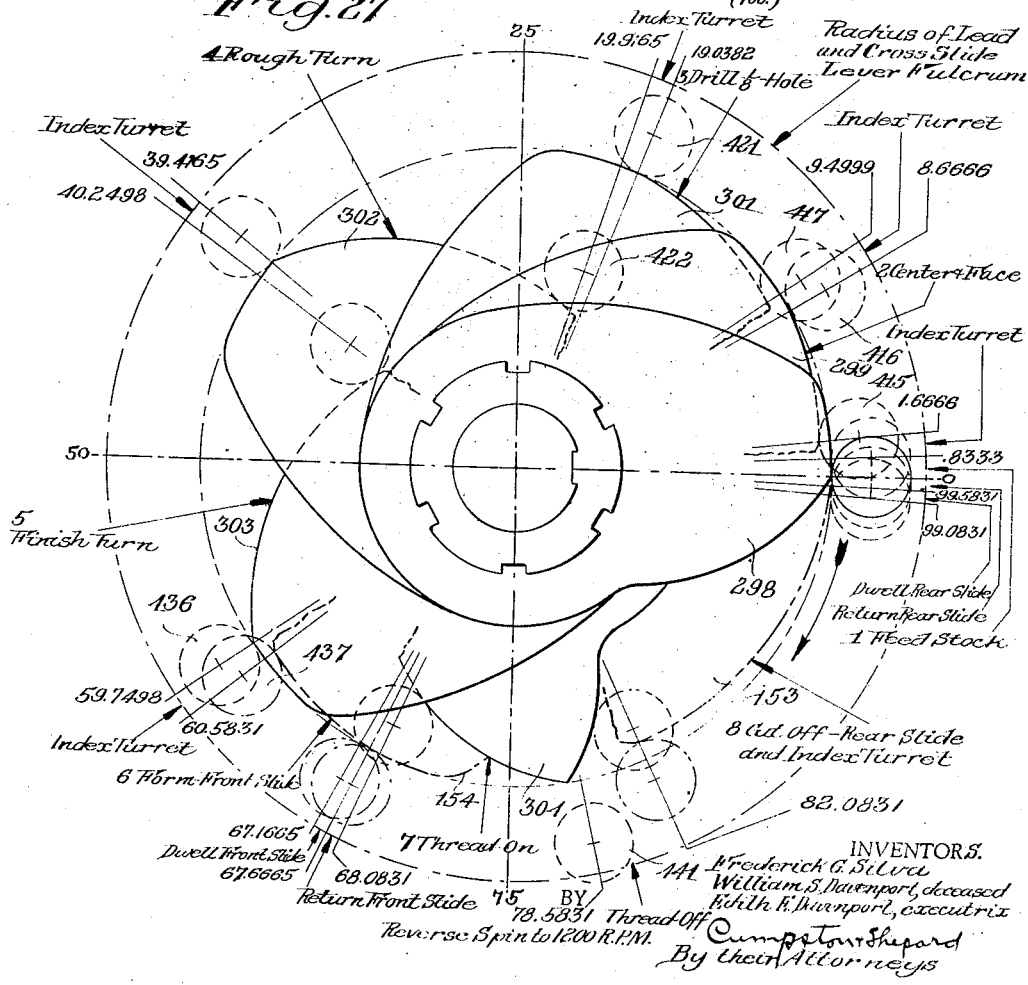

Patented Apr. 25, 1944

2,347,372

UNITED STATES PATENT OFFICE 2,347,372

AUTOMATIC FORMING MACHINE

Frederick G. Silva, Rochester, N. Y., and William S. Davenport, deceased, late of Rochester, N. Y., by Edith E. Davenport, executrix, Rochester, N. Y., assignors to Davenport Machine Tool Co., Inc., Rochester, N. Y., a corporation of New York Application March 31, 1941, Serial No. 386,130

24 Claims. (Cl. 29—44)

This invention relates to forming machines and more particularly to automatic forming machines of the type generally known in the art as automatic screw machines.

An object of our invention is to provide an automatic forming machine of greatly improved construction which will produce screw machine parts more economically than the machines of the prior art.

Another object of our invention is to provide an automatic forming machine, adapted to make a substantially infinite variety of small machined parts, which may be easily and quickly "set up" when the machine is to be changed over from making one part to making another.

Another object of our invention is to provide an automatic screw machine of the single spindle type in which the "set up" time is so materially reduced as to make economic use of the machine possible when a relatively small quantity of a particular part is to be made.

Another object of our invention is to provide an automatic screw machine of the single spindle type wherein the necessity is eliminated of cutting new cams or using existing cams not entirely suitable for the work each time a new job or a new piece is to be made.

Another object of our invention is to provide an automatic screw machine of the single spindle type wherein a standard set of cams is provided, which upon proper selection and mounting in the machine, may be employed to control the several tools in making substantially any desired piece within the capabilities of the machine, whereby the necessity is avoided of designing and cutting new cams each time a new and differently shaped piece is to be made.

Another object of our invention is to provide an automatic screw machine of the single spindle type wherein the usual turret is controlled by a series of cams, preferably one cam for each tool position of the turret, to thereby eliminate the usual intricately cut and multi-lobed cam now conventionally employed for controlling the turrets of present screw machines.

Another object of our invention is to provide an automatic screw machine of the single spindle type wherein the usual turret is controlled by a series of cams, preferably one cam for each tool position of the turret, the cams being preferably of a standard series and the cams and the machine being arranged so that control of the turret is thrown automatically from one cam to the other in sequence so as to eliminate, insofar as possible, lost or idle time between successive cutting operations.

The invention further provides a cam system for an automatic screw machine of the single spindle type wherein the cam followers are always working substantially at the high points of the cams to thereby eliminate loss of machine time occasioned by the necessity of the single cam follower of the conventional screw machine dropping to low points and rising to high points on its cooperating cam.

Our invention further comprises, in a single spindle machine, the provision of independent retraction mechanism for the turret and a series of independent cams, one for each tool position of the turret, the machine being arranged so that control of the turret is automatically passed from one cam to the other which, in cooperation with the independent retraction mechanism, enables a decrease in lost or idle movement time.

Another provision of the invention is an independent adjustable connection between each cam and the turret, whereby the advance of the turret for each tool position may be varied, even after the machine is set up, separately and individually while maintaining the same cam contour.

Our invention further provides means for adjusting the relation of each tool with respect to the work individually and separately from the others.

Another object of our invention is to provide a machine of the type to which this invention applies, wherein the tool shanks may be substantially always bottomed in their turret sockets and separate adjustments are provided for each tool position of the turret to thereby eliminate the tedious process of tapping the tools into position now generally employed in "setting up" screw machines.

Another object of our invention is the provision of means for varying the effective length of the lever arm between each cam and the turret so as to vary the amount of advance of the turret for each tool position of the turret.

Another object is the provision of an automatic screw machine of the single spindle type wherein the usual cross slides may be advanced and retracted with respect to the work quickly and in a constant period of time so as to reduce the idle time between cutting operations of the machine.

Another object of the invention is to provide mechanism for quickly advancing and retracting the cross slides and, in connection with the retraction mechanism, provide means for positively withdrawing the cross slides from the work.

A further object of our invention is to so coordinate the operations of the turret and cross slides that idle machine time caused by tool interference is reduced substantially to a minimum.

Still another object of our invention is to provide the cross slides of an automatic screw machine with cams which are part of a standard series with the cams for controlling the turret whereby the cross slide cams are interchangeable with the turret cams.

Our invention further comprises the provision of an automatic screw machine of the single spindle type wherein what may be called a vertical turret is provided, the operations of which may be coordinated with those of the horizontal turret and cross slides.

Other objects and advantages of our invention will be more particularly pointed out in the claims and will be apparent from the following description, when taken in connection with the accompanying drawings, in which:

Fig. 2 is a sectional view taken substantially on the line 2—2 of Fig. 1 showing the operating mechanism for the cross slides and vertical turret;

Fig. 3 is a view, partly diagrammatic, illustrating the arrangement of shafts and clutches for operating the various mechanisms of the machine;

Fig. 4 is a view partly in section of the turret or right hand end of the machine;

Fig. 5 is a sectional view taken substantially on the line 5—5 of Fig. 4, in the direction indicated by the arrows, showing the rear of the turret end of the machine;

Fig. 7 is a view similar to Fig. 6 with the turret in an advanced position;

Fig. 8 is a sectional view showing the arrangement of trip and stop levers for the clutches, those shown being the trip and stop levers for the horizontal turret and front cross slide;

Fig. 9 is a top plan view partly in section and taken substantially on the line 9—9 of Fig. 7 and showing the position of the parts when the turret is advanced;

Fig. 10 is a view similar to Fig. 9 showing the position of the parts when the turret is retracted;

Fig. 11 is a view showing one of the selectors or slide actuators in active position;

Fig. 12 is a top plan view of the turret end of the machine;

Fig. 13 is a sectional view taken substantially on the line 13—13 of Fig. 7;

Fig. 14 is a sectional view taken substantially on the line 14—14 of Fig. 7 showing the mechanism for making and breaking the toggle which actuates the turret slide;

Fig. 15 is a view partly in section showing the turret locking mechanism;

Fig. 16 is a view partly in section showing a single control or timing cam of the standard set, together with its connected linkage for operating one of the selectors of the machine of our invention;

Fig. 17 is a sectional view showing the manner in which the cams or timing elements for the current are removably mounted as a unit and driven;

Fig. 18 is a view showing the cam assembly with the cams in position ready for mounting in the machine;

Fig. 19 is an end view of Fig. 18;

Fig. 20 is a perspective view showing one of the tapered collars upon which the cams are mounted;

Fig. 21 is a view showing a piece such as might be made on a machine of our invention;

Fig. 22 is a view showing a series of sketches illustrating the operations required to make the piece of Fig. 21;

Fig. 23 is a work sheet giving the required information for setting up and operating one of the prior art machines to make the piece illustrated in Fig. 21;

Fig. 24 is a cam diagram for making the piece of Fig. 21, the cams being of the type employed in prior art screw machines;

Fig. 25 illustrates how the tools are mounted in the turrets of prior art machines;

Fig. 26 is a lay-out sheet similar to Fig. 23 which may be employed to give information required in setting up and operating the machine of our invention to make the piece of Fig. 21; and Fig. 27 is a view showing, in superimposed relation, the cams employed in the machine of our invention for controlling the turret and cross slides.

Figure 1:
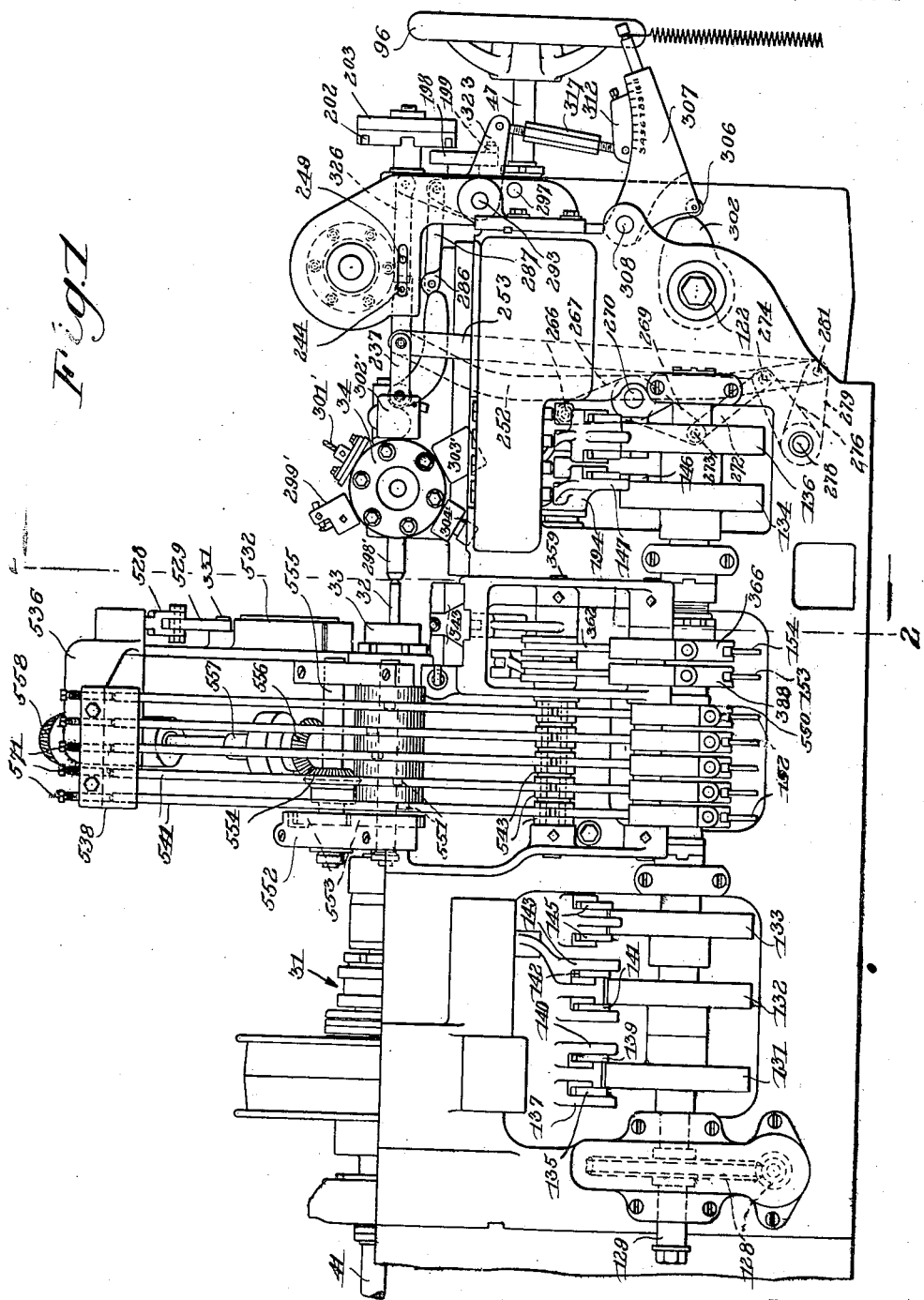
Fig. 1 is a front elevation of the novel automatic forming machine of our invention.

The automatic forming machine of this invention is of the single spindle, rotatable turret type. The general principles of its operation in a number of respects are similar to present machines. Since certain parts and mechanisms of the machine are similar to those of machines now in wide use, these parts will not be described in detail, as their construction and operation are well known in the art to which this invention applies. Reference is made for this purpose to William S. Davenport Patent No. 604,306, issued May 7, 1898, and to a bulletin entitled "Construction and use of automatic screw machines," published by Brown & Sharpe Manufacturing Co. of Providence, Rhode Island (1935). Reference is also made to William S. Davenport Patent No. 963,691, issued July 5, 1910. Certain of the parts disclosed but not claimed herein are claimed in applicant's divisional application, Serial No. 511,300.

Considering the operation of our machine in general, a bar of stock is firmly held in a spindle assembly, generally indicated by the numeral 31, and rotated at relatively high velocity. The end of the bar of stock protrudes, as shown at 32, from a work holder or chuck, indicated by the numeral 33, and various tools mounted in a rotatable turret or tool support 34 are successively presented to the bar of stock or work for performing machine operations thereon. The turret is advanced and retracted automatically with respect to the work, and indexed or rotated while in a retracted position so as to bring successive tools into operative relation with the work.

In addition to the tools carried by the turret 34, the machine is provided with tools which are advanced into cutting relation with the work and retracted with respect thereto in directions transverse to the axis of the work. These tools, indicated by the numerals 36 and 37 (Fig. 2), are mounted on what may be termed a front cross slide and a rear cross slide, respectively, indicated generally by the numerals 38 and 39. The spindle, by mechanism not entirely shown, may be driven in either direction. When right hand threading is to be done the spindle may be driven in a clockwise direction as viewed in Fig. 2, and may be reversed automatically and driven at slow speed for performing the threading operation. When pieces requiring left hand threads are to be made, the spindle may be driven at high speed in a counterclockwise direction, as viewed in Fig. 2, and then upon reversal the spindle may be driven at slow speed in the reverse direction to perform the threading operation.

The present invention relates primarily to the mechanism for operating, timing and controlling the advancement and retraction of the turret and cross slide tools so that the description will largely be confined to these parts. The spindle end of the machine may be to a large extent conventional. The spindle assembly 31 may comprise, as is well known in the art, the spring collet or chuck 33 located at the front of the spindle in an accessible position to be removed when changing for a different size of stock. The collet may be of any suitable construction. It may, for example, be closed by a tapered sleeve which is forced over it. The stock may be fed through the hollow spindle, when the spring collet or chuck is open, by a feed tube provided with suitable feeding means, such as a feeding finger.

The feed tube, as indicated at 41, extends to the rear of the spindle, and new bars of stock as required by the machine are inserted in the feed tube. It will be understood that the spring collet or chuck is opened, stock fed automatically, and the turret closed in timed relation with the other operations of the machine so that the machine is completely automatic. The operator's duties are, to a large extent, limited to setting up the machine, seeing that the machine is at all times supplied with a bar of stock, and to keeping the tools in a properly sharpened condition in accordance with usual practices. Moreover, the spindle is reversed and its speed changed automatically in accordance with the required operations to be performed on the particular piece being made.

The general operation of the machine is indicated in Fig. 3 which shows, somewhat diagrammatically, most of the shafts and clutches employed in reversing and changing the speed of the spindle, opening and closing the collet or chuck, feeding stock, and operating and controlling the various tools employed in performing operations on the work. It will be understood that as in all machines of this general type, the spindle is rotated independently of the actuation of other mechanisms of the machine. All other operations are in timed relation with each other. Thus the spindle may be driven by a motor independent of the motor 42, which drives all other mechanisms of the machine.

The motor 42 may be provided with a sprocket 43 upon which a chain 44 is mounted, which also extends over a sprocket 46 mounted upon a sleeve 45 carried loosely by a main drive shaft 47. The machine may be provided with a main starting clutch 48, the clutch element 50 of which is slidably keyed to the shaft. The starting clutch may be controlled by the operator through a hand lever (not shown). On the main drive shaft 47 a series of clutches and gears are mounted from which all of the operating parts of the machine are driven (except spindle rotation).

The main shaft will be rotated continuously as long as the motor 42 is operating and the main starting clutch is engaged. Disengagement of the main starting clutch stops all operations except rotation of the spindle. Also fixed to the main shaft there may be provided a gear 51 which meshes with a gear 52 loose on a shaft 53. The gear 52 may be coupled to the shaft 53 through a chuck and feed clutch 54 which is automatically engaged and disengaged in a manner which will be presently described. On the shaft 53 are mounted a pair of cams 56 and 57. The cam 56 may be employed to operate an arm or any other suitable means which actuates the stock feeding finger. The cam 57 may actuate another arm which opens and closes the chuck. These parts will not be further described, since they constitute no part of our present invention, and mechanisms for controlling and operating the stock feed and for opening and closing the spring collet or chuck are well known in the art to which this invention applies, and these or any other suitable mechanisms may be employed in the present machine.

Also mounted on and fixed to the main drive shaft 47 is a gear 58 which has secured thereto a clutch element 59. The clutch element 59 is adapted to be engaged by a clutch element 61 which is slidable along the shaft 47. The clutch 59, 61 is what may be termed a spindle reverse and change speed clutch. This clutch is actuated automatically when, for example, a threading operation is to be performed by the machine, as will be later described. The manner in which the clutch 59, 61 actuates the spindle reverse and change speed mechanism is also no part of the present invention, and suitable mechanism now generally known may be employed for this purpose.

The gear 58 drives a gear 62 loose on a shaft 63. The gear 62 is coupled to the shaft 63 so as to drive the shaft by means of a clutch assembly 64, one element of the clutch 64 being secured to the shaft 63, as shown at 66. The shaft 63, upon engagement of the clutch 64, rotates, through a disk 67, an eccentric pin 68. The eccentric pin actuates a lever or crank arm 69 which operates the rear cross slide 39 (Fig. 2).

Mounted on the main shaft 47 and fixed thereto is a bevel gear 71 which rotates a bevel gear 72 fixed to a shaft 73. The shaft 73 is employed in driving a so-called vertical turret which will be later described. Where a vertical turret is not desired the shaft 73, together with the bevel gear 72, may be conveniently removed from the machine.

Fixed to the main shaft is a gear 74 to which one element 76 of a clutch, generally indicated by the numeral 77, may be secured. The other clutch element 78 is secured to a clutch body 79 which is slidable along the main shaft 47. This clutch is employed, when engaged, to set into operation the various mechanisms for indexing the turret and actuating the turret slide later to be described.

Driven from the gear 74 is a gear 81 loose on a shaft 82. A pair of clutch elements 83, one of which may be fixed to the gear 81 and the other of which may be formed integral with a clutch body 84, is provided for actuating the front cross slide 38 (see Fig. 2). Upon engagement of the clutch elements 83 a disk 86 having an eccentric pin 87 thereon is driven so as to actuate a front cross slide lever or crank arm 88.

The clutch body 79 is slidably mounted on a sleeve 89. The clutch body 79, as in the case of most of the clutches shown, has tongues which slide in grooves provided in a collar 90 fixed to the sleeve 89. Gears 91, 92 are rigidly secured to the sleeve 89. The sleeve is loose with respect to the main shaft 47 which protrudes through the sleeve and has a hand wheel 96 mounted on the end thereof. Gears 93 and 94 are rigid with the main drive shaft 47, as indicated at 95. The hand wheel 96 is primarily used in setting up the machine for turning the feed or main drive shaft 47 by hand so as to properly set the elements for actuating the clutches in proper timed relation with each other. The gear 91 drives an idler gear mounted on an idler shaft which drives a cam, as will be presently described, controlling the advancement and retraction of the turret.

The gears 93 and 94 constitute the first change gears of a gear train to a driven shaft 104 located at the back of the machine. Any suitable change speed gear train may be employed, either incorporated in the machine, or, if desired, removable change gears may be employed instead of the arrangement shown. The gear train per se constitutes no part of our present invention, and will be briefly described as comprising a plurality of gears generally indicated by the numeral 106 mounted on an idler shaft 107, and a plurality of gears generally indicated by the numeral 108 mounted on a shaft 109. The gear train in addition includes a plurality of gears 111 mounted on an idler shaft 112, an idler gear 113 mounted on an idler shaft 114, and a plurality of gears 116 slidably keyed on the shaft 104. An end view of the change speed gear train is shown in Fig. 4.

Suitable means are provided, as shown at 117, 118, and 119, Figs. 4, 5, and 13, for shifting the gears on the idler shafts 107 and 112 and on the shaft 104, so as to vary the speed in accordance with the particular job to be performed by the machine. The idler gear 113 may be shifted, as indicated in dotted lines in Fig. 4. In general the change speed mechanism is employed so as to regulate the speed of rotation of the shaft 104 by which the speed of rotation of the turret and front and rear cross slide cams may be regulated so as to make one complete rotation during the time interval determined by the number of spindle revolutions required to made one piece.

The shaft 104 through a worm and worm wheel, generally indicated by the numeral 121, drives a shaft 122 usually termed in the art a lead or turret cam shaft. The lead cam shaft 122 has mounted thereon a cam assembly, generally indicated by the numeral 123.

Fixed to the shaft 104 adjacent its opposite end is a bevel gear 124 which meshes with a bevel gear 126 rigidly mounted on a cross shaft 127. The cross shaft 127 through a worm and worm gearing, generally indicated by the numeral 128, drives what is generally termed in the art a cross slide cam shaft 129.

One of the advantages of the driving arrangement shown is that both the lead cam shaft 122 and the cross slide cam shaft 129 are driven from the shaft 104 through worm and worm gearing. In the machines of the prior art it has been customary to drive the cross slide cam shaft from the lead cam shaft through beveled gearing of small diameter. A drive through such beveled gearing is subject to "play" between the gears. The effect of this play, measured on the working surfaces of the cams, is increased. Thus the lead and cross slide cam shafts are likely to get slightly out of time. While in the drive shown, a pair of beveled gears is employed at 124, 126, the effect of "play" between these gears is largely eliminated because of the use of the worm gearing 128. Moreover, the worm gear 128 is of approximately the same diameter as the cams so that the effect of the play is not increased on the working surface of the cam. Thus the lead and cross slide cam shafts are maintained in accurate timed relation and "play" is reduced to a minimum.

Mounted on the cross slide cam shaft are a plurality of trip dog carriers, designated by the numerals 131, 132, 133, 134 and 136. The trip dog carrier 131 carries trip dogs which actuate a trip dog 135 on a trip lever which extends across the bed of the machine and operates the chuck and feed clutch 54. The carrier end of the trip lever is indicated at 137 in Fig. 1, and the clutch end of the trip lever is indicated at 138 in Fig. 3. The trip dogs for actuating the chuck and feed clutch are mounted on the left side of the carrier 131 and engage the trip dog 135.

On the right side of the carrier 131 trip dogs (Fig. 1) are mounted for reversing the spindle and changing speed, that is, for actuating the clutch 59, 61 (Fig. 3). The trip dog actuated by the trip dogs on the right side of the carrier 131 are indicated at 139 and the trip lever at 140. On the left hand side of the carrier 132 (Fig. 1) trip dogs are mounted also adapted to actuate, through trip dog 141 and a trip lever, the spindle reverse and change speed clutch 59, 61 (Fig. 3) so as to reverse the direction of rotation of the spindle and change speed and restore the spindle to its former direction and speed of rotation. On the right hand side of the trip dog carrier 132 trip dogs are mounted which are connected by cross or trip levers to the rear cross slide clutch 64 (Fig. 3). The trip dog on the trip lever is shown at 142. The carrier end of the trip lever is shown at 143 in Fig. 1 and the clutch end of the trip lever is shown at 144 in Fig. 3.

The trip dog carrier 133 is adapted to carry trip dogs on each side thereof for actuating mechanism which sets into operation through suitable connections the vertical turret, as will be later described. The trip dogs for operating the vertical turret are mounted on each side of the carrier 133 so that the trip dogs may be closely spaced with respect to each other so as to trip the vertical turret clutch rapidly in succession should this be desirable. The trip dogs on the trip lever for the vertical clutch are indicated at 145. The trip dog carrier 134 carries trip dogs 146 (Fig. 1) on the right side thereof. These trip dogs are arranged to actuate a trip lever which actuates the front cross slide clutch 83. The forward end of the trip lever is indicated at 147 and the rearward end at 148 (Fig. 3). Trip dogs may be mounted on the left side of the carrier 134 for operating a work deflector or chute (not shown).

The trip dog carrier 136 carries trip dogs on each side thereof which are adapted to actuate a clutch tripping lever 167 (Fig. 1) which actuates the horizontal turret clutch 77. The rearward end of the clutch tripping lever 167 is shown at 151 in Fig. 3. As previously mentioned in connection with the vertical turret trip dog carrier 133, trip dogs are mounted on each side of the horizontal turret trip dog carrier 136. With this arrangement these trip dogs may be closely spaced with relation to each other on opposite sides of the carrier so that if desired the horizontal turret clutch may be tripped two or more times in rapid succession.

Mounted also on the cross slide cam shaft is a vertical turret cam assembly, generally indicated by the numeral 152, a rear cross slide cam 153, and a front cross slide cam 154. Suitable means are provided, as indicated at 156 and 157, to enable the vertical turret cam assembly 152 and the rear and front cross slide cams 153 and 154 to be removed from the cross slide cam shaft 129. The method of mounting and assembling the cams will be more particularly described in connection with the description of the horizontal turret or lead cam assembly 123.

The construction and operation of the clutches with the exception of the starting clutch 43 are all substantially the same. Moreover, the trip dogs on the carriers and their coacting trip dogs on the cross or trip levers are substantially all the same so that all these parts will be clear from a description of the method of operation of the horizontal turret clutch (see Fig. 8).

On each side of the trip dog carrier 136 a T-slot 158 is provided in which trip dogs 159 are mounted. The trip dogs are supported in position by nut and bolt assemblies 161, the inner end of the bolt being adapted to fit in the T-slot. The bolts are entered in the T-slots through a gate 162 and may be adjustably positioned at any point in the T-slot through the nut and bolt assembly 161. The ends of the trip dogs 159 have portions 163 which extend beyond the circumference of the carrier and are slightly cam shaped. When any particular trip dog is not used the dog is turned down so as not to protrude beyond the circumference. The carrier may be calibrated preferably in hundredths to facilitate the setting of the trip dogs. The trip dogs on the opposite side of the carrier are indicated at 164.

The carrier trip dogs 159 and 164 are adapted to engage trip dogs 166 mounted on each side of the cross or clutch trip lever 167. The lever trip dogs 166 are provided with cam surfaces 168 and are adapted to pivot at 169. The clutch which in this case is on the main shaft, and is the horizontal turret clutch 77, must be disengaged before the clutch makes more than, in this instance, one revolution. It is, therefore, desirable that the trip lever drop instantly after being raised in order to enable the clutch to disengage. For this reason the trip lever dog 166 is pivoted, as above described, and spring pressed as shown at 171.

Thus the clutch 77 on the main shaft is engaged when the toe of the lever trip dog 166 reaches the high point of the carrier trip dog 159. The cam surfaces of the trip dogs, as the lever trip dog is riding up the cam surface of the carrier trip dog, compresses the spring 171. When the toe of the lever trip dog 166 passes the high point of the carrier trip dog 159 the spring 171 instantly throws the dogs clear of each other so that the lever trip dog 166 snaps behind the carrier trip dog 159, as shown in Fig. 8.

The trip lever 167 extends across the bed of the machine as shown in Fig. 13 and is supported and pivoted on a shaft 170. At its opposite end the trip lever is provided with a pin or projection 172 which rides in a cam groove 173 (see Figs. 3 and 5). When the trip lever is raised by engagement of a dog on the carrier with a dog on the trip lever, the rear end of the lever is depressed until the projection 172 is lifted out of the groove 173. Springs 174, located in the clutch body 79, cause the clutch teeth 78 to engage the clutch teeth 76. To release the clutch member the end of the projection 172 rides in the cam groove 173 of the clutch body until a raised part of the cam (Fig. 5) passes by. A spring (which lies behind spring 183, Fig. 8) normally holds the trip lever with its rear end raised so that the projection will ride in the cam groove. The clutch is automatically disengaged at the completion of a full rotation. Simultaneously the springs 174 (Fig. 13) are compressed ready to operate the clutch again.

As shown in Fig. 13, the trip lever 167 has a projecting end 177 which engages an adjustable stop 178 mounted on the frame of the machine. The extension 177 and the stop 178 relieve the trip lever 167 and projection 172 of side thrust caused by the springs 174.

As shown most clearly in Fig. 13, for each trip lever there is a substantially parallel lever 179 mounted on the shaft 170 which may be called a stop or detent lever. Its function is to stop the rotation of the sliding clutch element 78 when it is thrown out of engagement and to positively lock and locate it in position until the clutch is operated again. This is accomplished by the roller or detent 181 (Fig. 8) on the lever which is forced into a V-shaped notch 182 in the periphery of the clutch body 79. When the trip lever 167 is depressed and the clutch is engaged the rotation of the clutch body 84 forces the roll 181 out of the V-shaped notch 182. This is accomplished against the action of a spring 183 which has a pin 184 which engages the forward end of the stop lever 179. The notch 182 extends longitudinally of the clutch body 84 and allows the clutch to slide somewhat along the stop. When the clutch is disengaged the roll is forced into the V-shaped notch by the spring 183 and prevents the clutch element 78 from rotating past its desired position. Upward movements of the rear ends of trip lever 167 and the stop lever 179 are limited by adjustable stops 186 and 187. The stop 186 may be mounted on the stop lever 167 so as to engage a boss 188 on the trip lever 179.

The horizontal turret clutch 77 above described is a full revolution clutch; that is, after being engaged it rotates one full revolution before disengagement occurs. The rear cross slide clutch 64 and the front cross slide clutch 83 (Fig. 3) are half revolution clutches and upon engagement rotate through one-half revolution before being disengaged. In Fig. 8 is shown the clutch body 84 which is the body of the front cross slide clutch. The clutch body 84 has two V slots 191 and 192 in which the roller or detent of a stop or detent lever 193 is adapted to engage. The trip lever for the front cross slide is shown in Fig. 8, and is indicated by the numeral 194 (see also Fig. 13).

As shown in Fig. 5, the gear 92 on the main shaft 47 drives a gear 196 fixed to a lay shaft 197. The shaft 197 is mounted in suitable bearings carried by the main frame and has mounted on one end thereof a crank 198. A roller 199 is held in position by a pin 201. The roller 199 is adapted to engage in radial grooves 202 formed in a disk 203. The crank 198 and the disk 203 constitute the elements of a Geneva motion. Its purpose is to actuate a lay shaft 204, upon which the end of the disk 203 is mounted, intermittently and at a velocity gradually increasing at the beginning of engagement and decreasing toward the end of engagement so as to avoid shock on the parts, for indexing the horizontal turret. As shown in the drawings, the disk 203 is provided with six radial grooves 202. This number may, of course, be varied and will depend upon the number of tool positions of the turret.

The lay shaft 204 is mounted in suitable bearings and has rigidly secured there a spiral gear 206, the purpose of which will be later described. The forward end of the lay shaft 204 is decreased in diameter, as indicated at 207 (Fig. 9), and has two flat sides, as shown more clearly at 208 in Fig. 8. The flat sided end of the shaft 204 is adapted to fit in a correspondingly shaped opening in a bushing 209 which is rigid with a sleeve 211. The sleeve is mounted in a suitable bearing 212 which is not carried by the frame of the machine but is instead carried by the turret slide 213 (see Figs. 7, 9, 14).

The sleeve 211 has formed at its forward end a bevel gear 214 which meshes with a bevel gear 216 which is keyed, as indicated at 217, to a sleeve 218. The parts are held in position by a nut 219. The sleeve is mounted in suitable bearings 221 carried by a portion of the casting which constitutes part of the slide 213. The sleeve extends through the bearing and at its outer end is enlarged to form the turret 34. The turret 34 is provided with the usual sockets 222 for reception of the shanks of the tools. The turret is also provided with the usual set of clamping screws 223 for holding the tool shanks in the turret sockets.

It will now be observed upon actuation of the disk 203 by the crank 201, that the turret will be indexed through one-sixth of a revolution. The connection between the shaft 204 and the beveled gear 214 permits the turret slide to be retracted and advanced notwithstanding the fact that the shaft 204 is carried in a stationary bearing. As shown in Fig. 14, the slide is mounted in ways 224 and 226 supported from the frame of the machine.

As shown in Figs. 9 and 14, mounted upon the slide 213 are two pair of supports 227 and 228 and a sidewardly extending arm 229. The supports and arm are bored for the reception of bearings and pins 231 (see Fig. 9). Extending in the spaces between the pairs of supports, are links 234 and 236 which are supported by and connected to the slide through the pins 231. On the end of the pin 231 which is carried by the arm 229, a third link 237 is mounted. A toggle block 238 is provided with forwardly extending lugs 239 which are provided with suitable bearings for the reception of pins 241 and 242 to which the other ends of the links 234, 236 and 237 are connected.

The toggle block is provided at its other end with a plurality of spaced lugs 243 which are bored for the reception of an elongated pin 244 which extends through the bores in the lugs. In the spaces between the lugs and mounted on the elongated pin are rollers 246 which constitute bearing points for a plurality of actuators or selectors, as will presently be described.

The ends of the elongated pin 244 extend beyond the limits of the toggle block and extend into bores provided in a pair of slidable guide bars 247 located on opposite sides of the toggle block 238 (see Fig. 9). The slidable guide bars are movable in bores 248 provided in the frame of the machine. A pair of pins 249 are provided, one in each of the slidable guide bars which extend sidewardly and lie in slots 251 provided in the frame.

Mounted on the pin 241 is a toggle breaker bar 252 (Figs. 9 and 14) and mounted on the pin 242 is a second toggle breaker bar 253. It will now be observed upon viewing Figs. 6 and 7 in conjunction with Figs. 9 and 10 that the links 234, 236 and 237 constitute one-half of a toggle, while the toggle block 238 constitutes the other half, and that the toggle may be made and broken by actuation of the toggle breaker bars 252 and 253. As will be more clear later, the toggle provides independent means for quickly retracting and advancing the slide. If desired, conventional mechanism for quickly advancing and retracting the slide may be employed in connection with the selector control of our invention. Moreover, it would be possible to advance the slide hydraulically or perhaps electrically but we have found the mechanical toggle arrangement shown to be satisfactory in operation.

The mechanism for actuating the toggle breaker bars 252 and 253 comprises the clutch 77 which upon engagement, as shown in Fig. 3, drives the sleeve 89 and gears 91 and 92. The gear 91 drives an idler gear 261 mounted on a stub shaft suitably supported from the frame. The idler gear 261 drives a gear 262 mounted on the shaft 170. The gear 262 has secured thereto a cam member 263. The gear and cam member 263 is free to rotate on the shaft 170. The cam member 263 is provided with a cam groove 264 which forms a continuous channel around the periphery of the cam member 263. A roller 266 carried by an arm 267 rides in the cam groove 264 as the cam member 263 is rotated.

Figure 6:
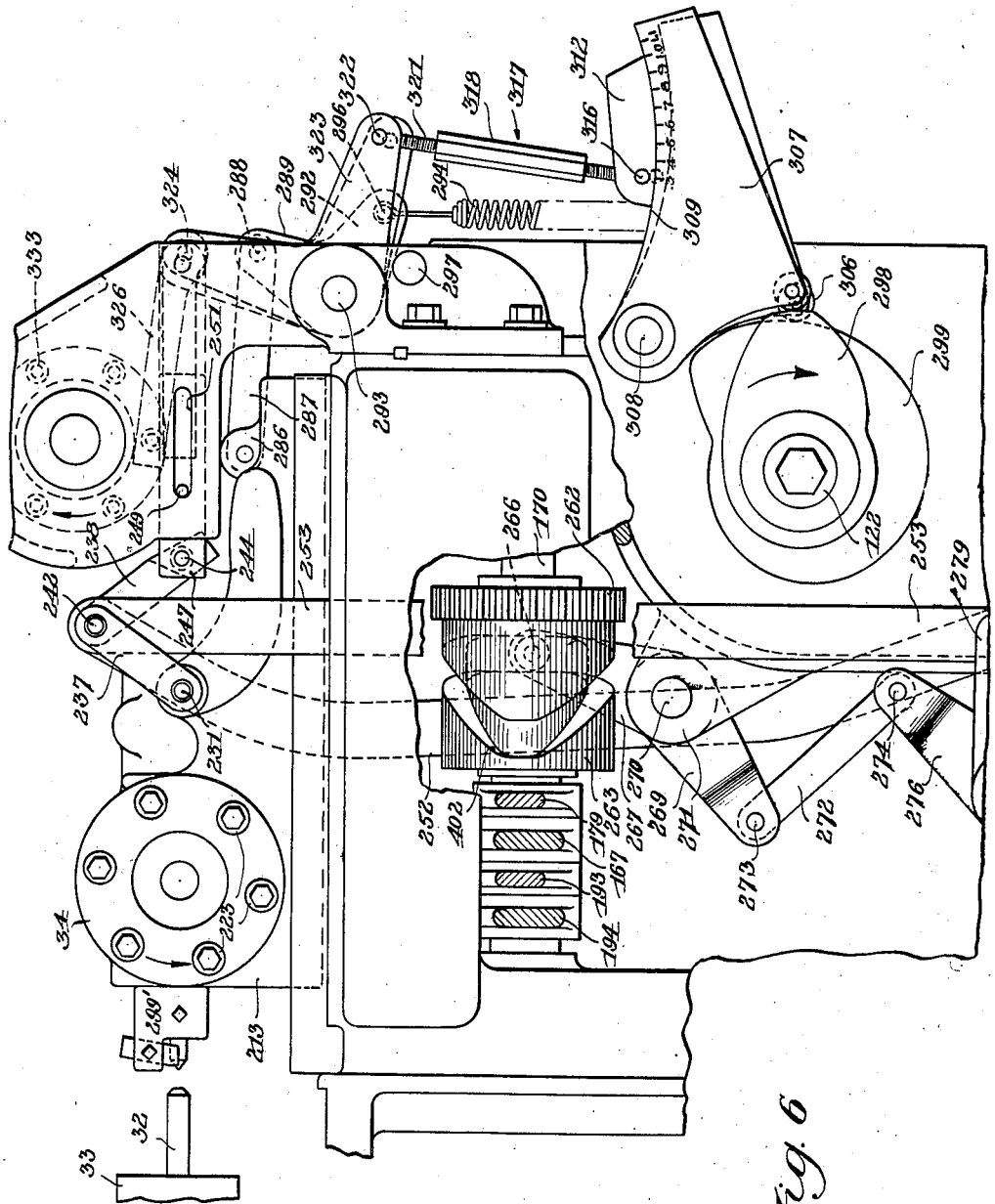
Fig. 6 is a front elevation of the turret end of the machine with parts broken away to better illustrate the invention, and with the turret in a retracted position.

The arm 267 (Fig. 14) is preferably integral with a boss 268. The boss is also integrally secured to an arm 269 and is free to rotate on a pin 270 carried by the frame of the machine, as shown at 271. The arms 267 and 269 constitute the arms of a bell crank, as shown in Figs. 6 and 7. A link 272 pivoted to the end of the bell crank arm 269, as shown at 273, has its other end pivoted at 274 to an arm 276. Arm 276 is preferably formed integral with a cylindrical member 277 which is rotatably mounted on a shaft 278 supported by the frame. To the cylindrical member 277 there is secured, preferably integrally, a pair of arms 279 which are pivoted by means of pins 281 to the lower ends of the toggle breaker bars 252 and 253, as shown in Fig. 14.

It will now be apparent that upon engagement of the clutch 77, the cam member 263 is rotated through one full revolution, the clutch 77 being a full revolution clutch, and the ratio of the gearing 91, 261 and 262 being 1 to 1. Starting with the parts in the position shown in Fig. 7, the roller 266 moves from the position shown in that figure to the position shown in Fig. 6. In the latter position of the roller the toggle breaker bars have been pushed upward by the bell cranks and links, above described, so as to move the parts to the position shown in Fig. 6 in which position the slide is retracted. When the slide is in the retracted position the turret is indexed by the mechanism above described.

In Fig. 6 the parts are shown with the turret indexed one position from that shown in Fig. 7 and with the cam member 263 in a position such that its continued rotation will cause the cam roller 266 to be shifted to the left, as viewed in Fig. 6. This exerts a pull downward on the toggle breaker bars 252 and 253 and causes the slide to be shifted so as to bring the next tool into cooperative relation with the work. The position of the roller 266 is not in strict accordance with the position of the other parts in Fig. 6. This has been done so that both sides of the cam could be shown (Figs. 6 and 7). With the turret indexed, as shown in Fig. 6, the roller would be nearer the end of the straight portion of the cam groove than as shown in Fig. 6.

When the parts of the toggle are in the position shown in Figs. 7 and 9, the pins 249 are near the rear of their slots 251. When the toggle is broken the toggle block 238 is drawn to the left, as viewed in Fig. 7, to the position shown in Fig. 6, while the slide and turret are drawn to the right and moved from the position shown in Fig. 7 to that shown in Fig. 6. In the position of the parts shown in Figs. 6 and 10, it will be observed that the pins 249 are in the forward portions of their slots 251 and engage the forward margins of the slots.

The purpose of this arrangement is to limit the movement of the toggle block 238 and provide a stop so that in breaking the toggle the turret is compelled to move to the right from its position in Fig. 7. Occasionally a tool, after completing an operation on the work, tends to "freeze" in position so that an appreciable force is required to retract the turret. The engagement of the pins 249 at the ends of the slots 251 insures that, when the toggle is broken, the breaking force will be applied to withdraw the tool from the work and retract the slide. The tool is thus positively withdrawn from the work should it tend to resist withdrawal.

While the tool on the turret is performing a cutting operation the turret is locked in position by a turret lock, shown in detail in Fig. 15. On the end of the lay shaft 197 (Fig. 5) a wide faced cam 283 is mounted (see also Figs. 12 and 14). As the lay shaft rotates it is adapted to actuate a locking lever 284 which is pivoted on the slide, as shown in Fig. 15. The locking lever is pivoted, as shown, to a spring pressed locking pin 285. The turret is provided with a plurality of openings 285' for the reception of the locking pin.

With the locking pin 285 in one of the openings 285', as shown in Fig. 15, when the turret clutch is actuated, the lay shaft 197 is rotated so as to rotate the cam 283 in proper timed sequence. The rotation of the cam 283 actuates the locking lever 284 to withdraw the locking pin 285 against the action of the spring. The turret may then be indexed. When the indexing operation has been completed the turret has been rotated to bring another opening 285' in the turret in registry with the locking pin 285. The continued rotation of the cam 283 releases the locking lever and permits the spring to push the locking pin into the turret opening 285' and thus locks the turret for the next operation.

Secured to the rear end of the slide is a boss 286 to which a link 287 is pivoted. The other end of the link is pivoted, as indicated at 288 (Figs. 6 and 7), to a bell crank 289, one arm of which is shown at 291 and the other arm of which is shown at 292. The bell crank is pivoted on a rod 293. A spring 294 has one end secured, as shown at 296, to the arm 292 of the bell crank 289 and its other end secured to the frame of the machine. The bell crank 289 is adapted to engage a stop pin 297, as shown in Fig. 6, when the slide is fully retracted. The link 287, bell crank 289, and stop pin 297 serve, when the bell crank is in engagement with the stop, to limit the rearward movement of the slide so that the slide and turret are always retracted to a definite position with respect to the work. The spring 294 aids in retracting the slide and also serves as a resistance so that when the tools are fed into the work, by mechanism to be described, the resistance to the advance of the slide offered by the spring 294 prevents the tool from chattering. Moreover, all lost motion in the connecting parts between the cams and the turret is taken up.

The mechanism for advancing the slide during cutting operations comprises the lead cam shaft 122 upon which a plurality of timing elements or cams 298, 299, 301, 302, 303 and 304 are mounted. Each of these cams is adapted to actuate the slide so as to advance the turret during cutting when the turret is in one of its tool positions. Thus in Fig. 7 the tool positions of the turret have been designated by numbers 298', 299', 301', 302', 303', and 304' corresponding to the reference numerals of the cams. Each of these cams is successively connected to the slide so as to advance the slide when the turret is in the corresponding tool position. That is, the cam 298 controls the advance of the slide when the position of the parts is as shown in Fig. 7. When the turret is in the position shown in Fig. 6 the cam 298 is disconnected from the slide and the cam 299 controls the movement of the slide. The control of the slide thus shifts from cam to cam as successive operations are performed on the work until the piece is completed.

Each of the cams is engaged by a roller or cam follower 306 carried by a cam lever or segment 307 which is generally of triangular shape (see Fig. 16). Since the turret is provided with six tool positions and the machine has six control cams or timing elements, six cam levers or segments 307 are provided. All of the segments are pivoted on a pin 308 supported in the frame of the machine. The upper surface of each cam segment is cut preferably on the arc of a circle, as indicated at 309. A T-slot is provided, as indicated at 311, for the reception of an adjustable block 312. A screw 313 having a tapered end is arranged so as to tighten a bolt 314 against the adjacent margins of the slot and hold the block in any desired adjusted position.

The block has pivoted thereto, as shown at 316, one end of an adjustable connection or turnbuckle, generally indicated by the numeral 317. The turnbuckle comprises the usual internally threaded member 318 into which externally threaded members 319 and 321 extend. By properly adjusting the threaded members 318 the turnbuckle may be either shortened or lengthened as desired. Each of the turnbuckles has its other end pivotally secured as shown at 322 to a bell crank 323. Each of the bell cranks 323 is rotatably mounted on the rod 293 and has pivotally secured to the end of its other arm, as shown at 324, an arm, selector, or slide actuator 326. It will now be observed that as the lead cam shaft rotates, the cam segments are actuated so as to pivot the bell cranks 323 about the rod 293 and thus move the selectors 326.

The number of selectors 326 corresponds, as will be understood, to the number of cams. In this instance six selectors are provided, and each slide actuating mechanism from the cam to the selector 326 is an independent actuating mechanism for the slide separately controlled and timed by its own cam. Another fact of importance which will be perhaps more clear later, is that the slide is retracted independently of the cams and the connections between the cams and the slide.

In Figs. 9 and 10 to simplify the drawings, we have shown only two of the selectors 326. The selectors are adapted to slide between the spaced lugs 243 and engage the rollers 246, which as previously mentioned are carried by the pin 244 supported by the toggle block 238. The rollers constitute collectively, a common abutment for the selectors. In Fig. 11 we have shown one of the selectors 326 in engagement with its roller 246. The selectors are normally held in an angular position by springs 327 which are carried by the bell cranks 323, as shown at 328. The normal position in which the selectors are held by the springs is shown in dotted lines in Fig. 6.

As previously mentioned, the spiral gear 206 is rigidly secured to the lay shaft 204 which intermittently indexes the turret. The spiral gear 206 drives a spiral gear 329 rigidly mounted on the shaft 331 (Figs. 4 and 12). The shaft 331 has rigidly secured thereto a series, in this instance six disk assemblies 332, each of which carries a roller 333. These rollers are spaced or staggered with respect to each other by properly locating the disc assemblies on the shaft 331 so that the rollers are 60° apart, as shown in Figs. 6 and 7. Each time the spiral gear 206 is rotated the rollers 333 are moved one station or 60°. The rollers are carried in spaced relation by their disks in a position to engage the selectors, as shown in Fig. 4, and push them downward into active position against the action of springs 327.

In Fig. 7 we have shown the lowermost roller 333 in dotted lines as being in engagement with one of the selectors. An adjacent selector is shown in a disengaged position with respect to its roller 246 of the toggle block and in a position to be engaged by a succeeding roller 333. In Fig. 9 the lowermost roller 333 is engaging its selector 326 and holding it in position to advance the toggle block and slide. In Fig. 10 this selector has been released and the next roller 333 has come down into effective position. In Fig. 7 the rollers 333 have been numbered 298″, 299″, 301″, 302″, 303″, and 304″, to show that each corresponds to one of the cams and one of the tool positions of the turret.

It will be observed from Fig. 9 that the position of the selector, when the toggle is straightened, limits the rearward movement of the toggle block and hence determines the position to which the slide is advanced preparatory to the commencement of a cutting operation. The position of the selector in turn is dependent on the setting of the turnbuckle 317 and on the position of the particular active cam at the instant when the toggle is straightened out. If no selector is in an active advanced position, as would be the case when no cutting operation is to be performed with the turret in one of its tool positions, the toggle is straightened out but the slide is not advanced to its active position.

As will be appreciated from Fig. 7, each of the cams has a lobe and the lobes of the several cams are offset with respect to each other so that the rollers 306 are successively riding on the lobes of their corresponding cams. However, any particular cam is not effective to control the slide until its corresponding selector 326 is pushed down into effective position by the corresponding roller 333. Moreover, it will be apparent from Fig. 7 that each of the cams has a low point. To prevent the segments 307 and the bell cranks 323 from dropping down too far when the rollers 306 are riding on the low points of the cams, the stop pin 297 is arranged so as to support the bell cranks as shown in Fig. 7. This provision prevents the selectors 326 from dropping back so far as to be out of position for engagement by the rollers 333. While the springs 327 (Fig. 11) throw the selectors upward out of engagement with the rollers 246 they are arranged to throw them only to an angular position such that they may be engaged by the rollers 333. The stop pin 297 also holds the cam followers off of the cams when cam low points are reached.

As previously mentioned, the machine is provided with a front cross slide 38 and a rear cross slide 39. The arrangement and construction of the tool posts for adjustably supporting the front and rear cross slide tools is to a large extent conventional, suitable arrangements being well known in the art to which this invention applies. It is sufficient to state that the tools are adjustably supported in adjustable tool posts, generally indicated by the numerals 341 and 342, which are carried by the slides. The front and rear cross slides are mounted in suitable ways, as indicated at 343 (Fig. 1), and are operated in timed relation with the timed and controlled movements of the turret.

The mechanism for operating and controlling the front cross slide comprises the trip dog carrier 134 (Figs. 1 and 3), one of the trip dogs mounted thereon being shown at 146. The trip dogs 146 are properly set on the trip dog carrier to actuate the trip lever 194 so as to permit engagement of the clutch 83 (Fig. 3) in proper timed relation with the other operations of the machine. Since all of the carriers are on a shaft which carries the cross slide cams and since this shaft rotates at the same speed as the lead cam shaft 122, all operations of the machine may be timed to occur in proper sequence by properly setting the trip dogs on their respective carriers.

When the trip lever 194 is actuated by one of the trip dogs on the trip dog carrier 134 the clutch 82 is engaged and the shaft 82 rotated through 180° before it is disengaged. Rotation of the shaft 82 through 180° rotates the crank pin 97 a corresponding amount which actuates the front cross slide lever 88 (see Fig. 2). The front end of the cross slide lever 88 is pivotally connected, as shown at 344, to a bell crank 346 pivoted on the rod 347. The bell crank 346 is pivotally connected at its other end, as shown at 348, to a link 349. The link 349 is pivoted, as shown at 351, to the ends of links 352 and 353 which constitute a toggle. The link 353 of the toggle 352, 353 is pivoted, as shown at 354, to a block 356 connected to the front cross slide 38. The link 352 of the toggle 352, 353 is pivotally connected, as shown at 357 to a bell crank 358. The bell crank 358 is pivoted on the rod 359 and has its other end pivotally connected at 361 to an arm 362.

The arm 362 is pivotally connected at 363 to an adjustable block 364. The block 364 is similar in construction to the block 312 and is adjustably supported in a T slot provided in a cam lever or segment 366. The cam segment for the cross slide has a curved upper edge which is preferably formed on the arc of a circle struck from the point 361. The cam lever segment 366 is pivoted on a rod 367 and carries a roller or cam follower 368 adapted to be engaged and actuated by the front cross slide cam 154. In the position of the parts shown in Fig. 2, the roller 368 is not in engagement with the cam 154, since the toggle 352, 353 is broken. However, when the toggle is straightened and, as the cross slide cam shaft 129 continues to rotate, the lobe of the cam 154 will engage the cam follower 368 so that control of the slide during cutting operations depends upon the contour of the cross slide cam.

It will now be appreciated that, when the front cross slide clutch 83 is tripped, rotation of the front cross slide crank 86 will, through the front cross slide lever 88, bell crank 346 and link 349, cause the toggle 352, 353 to be straightened out and the front cross slide 38 to be advanced rapidly into spaced relation with respect to the work. By the time the toggle is straightened, the lobe of the cam 154 has reached a position such that it engages the roller 368 and thereafter further advance of the front cross slide 38 is under the control of the cam 154 through the cam segment 366, block 364, arm 362, bell crank 358 and the then straightened toggle 352, 353.

When the front cross slide tool has completed its cutting operation another trip dog 146 on the front cross slide carrier 134 actuates the front cross slide trip lever 194 so as to permit the clutch 83 to be again thrown into engagement. Reengagement of the clutch 83 rotates the front cross slide crank 86 through 180° so as to pull the front cross slide lever 88 to the right, as viewed in Fig. 2, or to the position shown in that figure. Actuation of the front cross slide lever 88 through the bell crank 346 and link 349 breaks the toggle 352, 353 to retract the front cross slide 38 rapidly.

As soon as the toggle 352, 353 is broken the cam 154 is no longer effective to control the front cross slide and, regardless of whether or not the cam follower 368 is on the high point of the cam 154, it has no effect on the front cross slide. As previously described in connection with the operation of the turret, the front cross slide tool occasionally tends to "freeze" on the work. To insure that the front cross slide will be withdrawn when the toggle 352, 353 is broken, a positive pull out is provided. This is accomplished by providing a stop 370 on the frame against which the bell crank 358 may butt when the toggle 352, 353 is broken. Thus upon breaking the toggle a positive pull will be exerted on the link 353 of the toggle so as to positively withdrawn the front cross slide should it tend to stick.

The mechanism for operating the rear cross slide 39 comprises the trip dog carrier 132 (Fig. 1), adjustable trip dogs mounted on the right face of the trip dog carrier, trip lever 143, which is connected, as shown at 144, to the clutch 64 (Fig. 3). The rear cross slide clutch 64 is similar to the front cross slide clutch 83 and is provided with a stop lever similar to the stop lever 193 (Fig. 8). The rear cross slide clutch is also a half revolution clutch which upon engagement rotates crank disk 67 through 180°. The crank actuates the rear cross slide lever 69 (Fig. 2) the end of which is pivotally connected to the links 369 and 371 of a toggle. One link of the toggle is pivoted, as shown at 372, to a lever 373 which is pivoted on a pin 374 carried by the frame. The end of the lever 373 is pivotally connected, as shown at 376, to a slide link 377. The slide link 377 is pivoted, as shown at 378, to the rear cross slide 39.

The link 369 of the toggle 369, 371 is pivotally connected at 379 (Fig. 2) to one arm of a bell crank 381. The bell crank 381 is pivotally mounted on a rod 382 and has its other arm pivotally connected, as shown at 383, to a link 384. The forward end of the link 384 is pivotally connected as shown at 386 to a bell crank 387, one arm of which appears in Fig. 2, and the other arm of which lies directly behind an arm of the bell crank 358, as viewed in the same figure. The end of the bell crank 387 hidden in Fig. 2 is connected by an arm to an adjustable block carried on a cam segment 388. The cam segment in Fig. 2 is hidden by the cam segment 366 but appears in Fig. 1. The cam segment 388 carries a roller or cam follower which is adapted to cooperate with the rear cross slide cam 153 (see Figs. 2 and 3).

It will now be apparent that when the clutch 64 is engaged upon actuation of the trip lever 143, 144, the crank 67 is rotated through 180° thereby straightening out the toggle 369, 371. When the toggle is straightened out the clutch is automatically disengaged and thereafter the movement of the rear cross slide is controlled by the cam 153 through cam segment 388, bell crank 387, link 384, bell crank 381, toggle 369, 371, lever 373, and slide link 377. The function of the toggle is the same as that of the toggle 352, 353 for the front cross slide. That is, upon straightening out the toggle 369, 371 the rear cross slide 237 is rapidly advanced in close spaced relation with respect to the work. The tool is then advanced by the cam 153 to perform cutting operations.

As soon as the cutting operation is completed the clutch 64 is again engaged, by reason of the proper setting of the trip dogs on the rear cross slide carrier 132, so as to break the toggle 369, 371, and quickly pull the rear cross slide 39, together with the tool 37, away from the work. As described in connection with the front cross slide, a stop is provided for the rear cross slide. For this purpose the same stop 370 may be employed against which the hidden arm of the bell crank 387 may butt so that in breaking the toggle, a positive pull will be exerted on the lever 373 causing the rear cross slide 39, together with the rear cross slide tool 37, to be positively pulled away from the work.

For the purpose of adjusting the position to which the cross slides are advanced when the toggles are actuated turnbuckles in the connections from the cams similar to the turnbuckles 317 might be employed. However, in connection with the cross slides a modified form of adjustment is provided. These are preferably in the form, as shown in Fig. 2, of adjusting screws 404 and 405 for the front and rear cross slides, respectively. The screws are adjustably mounted in bosses 406 carried by a stationary portion of the slide. The end of the screw extends into the slide so that upon adjusting the screw the slide may be set forward or back with respect to its support. After the cams for the front and rear cross slides have been selected and properly positioned on the front cross slide cam shaft and after the adjustable blocks have been properly positioned, upon feeding the front and rear cross slides by hand, the proper positions of the front and rear cross slides with respect to the work are thus obtained by setting the screws 404 and 405 prior to the commencement of the cutting operation.

For the purpose of providing a resistance against which the cross slides may operate so as to prevent the tools from chattering, springs 408 may be provided (see Fig. 5). One end of the spring bears against a stationary part of the slide and the other end thereof bears against the slide and tends to move the slide in a direction away from the work. The springs not only serve to provide a resistance against which the cross slides are fed, but also aid in the retraction of the cross slides.

One of the important advantages of our invention lies in the fact that all of the cutting operations of the machine may be controlled by a standard set of a few cams or control elements. With this standard set of cams substantially any piece, within the capabilities of the machine, may be made. This will be more clear from a consideration of the practices of the prior art.

Ever since and prior to the issuance of William S. Davenport Patent No. 603,406, on May 17, 1898, the practice has been to individually design and cut a cam for each job to be performed by the machine. It has been the standard practice for about fifty years to control the endwise movements of the turret slide by means of an integral cam on which various shapes of cam lobes were formed. The cam lobes controlled, respectively, the successive movements of the turret slide toward the work, for time durations and for distances determined by the cutting which the respective tools were to perform upon the work. Such a cam is shown in Fig. 24.

Assuming that the tools carried by the turret, in connection with the making of a particular piece, were required to perform six cutting operations upon the work, it was necessary to provide a cam with six cam lobes thereon, one cam lobe for controlling each of the tools. Thus the cam shown in solid lines in Fig. 24 is provided with six cam lobes, five of which are adapted to control cutting tools, while the sixth controls the position to which the stock is advanced.

Cams of the type shown in Fig. 24 are expensive to make, for the reason that they must be carefully laid out and cut in strict accordance with the work to be performed. Moreover, the time required to lay out and cut the cams often necessitates the machine standing idle during this period unless production schedules are carefully planned. In laying out and cutting the cam if any one of the lobes should be inaccurately or incorrectly formed, or if it should be desired to change the cutting done by any one of the tools, either in time duration or length of cut, a change in the lobe of the cam controlling the corresponding tool would be required. This would usually necessitate the making of a completely new cam with the attendant delay and expense.

Moreover, the cams are usually laid out so that a piece is completed upon each rotation of the cam, or upon each rotation of the lead cam shaft 122 (Fig. 3). This is accomplished by determining the number of spindle revolutions required for each operation in accordance with the speed at which the particular cutting tool may be fed, the distance it is to be fed, and the hardness of the stock. The idle movements are also determined as, for example, the lost time during which the slide is retracted, the turret indexed and again advanced to a position with respect to the work such that the succeeding tool may perform its cutting operation. The total of spindle revolutions required for cutting operations and idle movements must equal the full circumference of the cam. The speed of the lead cam shaft is regulated by the change speed gears to give the number of spindle revolutions required within the time the lead cam shaft completes a rotation.

The drops or depressions in the cam extend through such angle of the cam and to such depths as to permit retraction of the tool with proper clearances between the tool and the work to enable the turret to be indexed. The angle of the cam through which these drops or depressions extend depends, in most cases, on the speed of rotation of the cam. If it should be found that by reason of a change in the character of the material being operated upon, or for other reasons, perhaps due to miscalculation of cutting times required, the work could be performed more rapidly, a speeding up of the rotations of the cam would upset the timing. That is, an increase in the speed of rotation of the cam disarranges the relation between the speed of rotation of the cam and the angle of the cam reserved for idle movements. Thus should the speed of rotation of the cam be increased, there may be insufficient time available for indexing the turret within the space provided on the cam. For the above reasons, even though it might be found upon completion of a cam that the number of pieces completed per hour could be increased, it was usually not economical to speed up the machine for the reason that such a speed up would usually require the cutting of a completely new cam.

A further disadvantage of the machines of the prior art, requiring the cutting of a different cam for each job, was that in order to pay for the time required to lay out and cut a cam, it was necessary that a large quantity of similar pieces be made. It was not economical to set up an automatic screw machine for making a particular part unless a large quantity were to be produced. For this reason small orders of parts have, to a large extent, been heretofore made on other and non-automatic types of machines.

While the above outlined practices have to a large extent been standardized for the past half century, others have sought to overcome the disadvantages of the necessity of cutting an integral multi-lobed cam by making each of the lobes separate. Such an arrangement is shown in Fisher et al. Patent 1,793,279, issued February 17, 1931. In accordance with the disclosure of this patent, each of the cam lobes is separately cut and assembled to provide a composite cam, which has essentially the same contour as an integrally cut cam. The composite cam has the number of cam lobes required for performing a job at hand and depressions or drops are provided between adjacent cam lobes for enabling the retraction, indexing and advancing of the slide.

The advantage of the arrangement shown in Fisher et al. patent lies in the fact that the separate cam lobes may be adjusted with respect to each other and the individual cam lobes may be substituted for one another. To a certain extent the cam lobes may be standardized so that if the owner of a machine has a complete set of cams he may assemble a composite cam to perform a large proportion of jobs likely to be encountered. However, a complete set of cams, as will be appreciated, involves a large number of differently shaped cam lobes, including high and low cams and cams of different leads, requiring a considerable investment in cam parts and involving most of the disadvantages of the integrally cut cams with the exception of decreasing the cost of laying out and cutting the above described multi-lobed integral cams. Moreover, in the case of the cams of the Fischer et al. patent, fine adjustment of the cam lobes with respect to each was not possible because of the necessary spacing of the teeth on the central portions of the cams.

The complete set of standard cams for use in connection with the machine of our invention has not been shown in the drawings. However, those employed in making the piece illustrated in Fig. 21 are shown in Fig. 27. It is believed that for an understanding of the invention it will be sufficient to describe the preferred basis upon which the series of cams is made.

In connection with the particular machine illustrated, all cams for both the lead and cross slides are five inches in diameter, although the particular size of cams is unimportant and will vary with the size of the machine. With a five inch cam diameter, a number of the cams of the series may be provided each with a uniform rise from the low point of the cam to the high point of the cam of one and one-fourth inches, although this total rise may be varied as desired. The first cam of the series may, for example, be cut so that it has a rise of one and one-fourth inches in ten one hundredths (.10) of the cam surface. The next cam may be provided with a rise of one and one-fourth inches in twenty one hundredths (.20) of the cam surface.

For small rises at relatively slow cutting speeds a number of cams may be supplied. These cams may be provided with rises decreasing in substantially uniform decrements and are, to a large extent, employed in connection with the cross slides but, of course, may be used on the lead cam shaft. In addition, a group of threading cams are provided.

Thus, a complete set of cams is shown in the following table (subject to such minor additions as may be found necessary):

| Cam No. | Rise in inches | Hundredths of cam surface | Rise per hundredth of cam surface | Dwell in hundredths |
|---|---|---|---|---|
| 1 | 1.250 | 10 | .125 | 4 |
| 2 | 1.250 | 20 | .0625 | 4 |
| 3 | 1.250 | 30 | .0416 | 4 |
| 4 | 1.250 | 40 | .03125 | 4 |
| 5 | 1.250 | 50 | .025 | 4 |
| 6 | 1.250 | 60 | .0208 | 4 |
| 7 | 1.250 | 70 | .0178 | 4 |
| 8 | 1.250 | 80 | .0156 | 4 |
| 9 | 1.250 | 86 | .0145 | 4 |
| 10 | 1.032 | 86 | .012 | 4 |
| 11 | .774 | 86 | .009 | 4 |
| 12 | .516 | 86 | .006 | 4 |
| 13 | .258 | 86 | .003 | 4 |
| 14 | .172 | 86 | .002 | 4 |
| 15 | .086 | 86 | .001 | 4 |
| 16 | .043 | 86 | .0005 | 4 |
| 17 | Dwell | 100 | | |
| 18 | 1.000 / 1.000 Drop | 15 / 5 | .0666 | 0 |
| 19 | 1.000 / 1.000 Drop | 18 / 6 | .0555 | 0 |
| 20 | 1.000 / 1.000 Drop | 21 / 7 | .0476 | 0 |

Cams Nos. 18, 19 and 20 are threading cams.

The above set of cams is believed to comprise a complete set capable, upon properly setting up the machine of our invention, of performing any job likely to be encountered and within the capabilities of the machine. If desired, additional cams of the series may be provided. It will be appreciated that the basis upon which the cam series is worked out, is more or less arbitrary, and other systems may be employed. The object of the system is to provide a cam which will give substantially any desired rise per hundredth of cam surface with the size of the machine taken into consideration.

In Fig. 16, we have illustrated the number 2 cam of the above series. It will be noted that the rise starts at the point marked seventy-six one hundredths (.76) of the cam surface, and rises one and one-fourth inches to the point marked ninety-six one hundredths (.96) of the cam surface. From ninety-six one hundredths (.96) to the zero (0) point a dwell is provided. In other words, the arc formed from ninety-six one hundredths (.96) to the zero (0) point is the arc of a circle two and one-half inches in radius. This is for the purpose of permitting a few revolutions of the spindle, after the cutting operation has been completed, to finish the cut. Each of the cams of the entire series may be provided with this same dwell (also arbitrarily selected) and as will be later explained none or any desired portion of this dwell may be employed. The drops on the cam may be any desired shape as it will be clear that the tools are not controlled by the cams during the cam drops.

The above series of cams will not provide all the rises which may be required in making the substantially infinite number of parts of which the machine is capable. For the purpose of obtaining modifications of these rises so that any desired rise may be obtained, the above described adjustable block 312 and cam segment 307 are employed. Referring to Fig. 16, it will be noted that the cam segment is pivoted at 308. With the cam shown in Fig. 16 which actuates the cam segment 307, it will be observed that the further the block 312 is placed from the pivot point 308, the greater the amplitude of movement of the bell crank 323. That is, by shifting the block 312 in its grooves 311, along the arc of the circle 309, the advance of the slide may be varied within certain limits.

In Fig. 16 the cam block has been graduated in tenths. A suitable reference point is provided on the block 312, which may be the end of the block, or the point 401. When the point 401 is in registry with the 1.0 mark on the cam segment, the advance of the slide during cutting operations corresponds to the actual rise of the cam. That is, if cam No. 2 shown in Fig. 16 were employed and the full rise of the cam used, the tool during cutting (less the usual thousandths required for tool clearance) would advance into the work one and one-fourth inches or .0625 of an inch for each one hundredth of the cam surface.

If the reference point 401 were shifted so that it was in registry with the .8 mark on the cam segment, then the total advance of the tool would be eight-tenths (.8) of one and one-fourth inches, or one inch. Similarly, if the reference point 401 were placed in registry with the 1.1 mark, the total advance of the tool during cutting operations would be 1.1 times 1.25 or 1.375 inches.

Those skilled in the art will now appreciate that the standard set of cams set forth in the above table, when used in conjunction with the adjustable block 312 and cam segment 307, will enable the operator to set up his machine to obtain substantially any desired advance of the tool during cutting operations within the capabilities of the machine. While it would be possible to develop a more complete set of standard cams and eliminate the adjustable block and cam segment above described, the number of cams required would be so large as to make such a system both cumbersome and expensive. With the system of our invention, the operator may select the one of the standard cams which gives him a rise approximating that which he desires and then may shift the block 312 along the cam segment 307 so as to obtain the exact rise desired.

The cams for the front and rear cross slides are interchangeable with the cams for the horizontal and vertical turrets. All of the cams, as previously mentioned, are of the same diameter, and a No. 2 cam, for example, may be employed, where it has the proper rise to fit the particular cutting operation to be performed, for actuating the cross slides or vertical turret as well as the horizontal turret. In the case of the prior art machines separate cams must be cut for the front and rear cross slides and the cams are not interchangeable.

A further fact which should be noted is that the series of cams have rises graduated in small decrements from the No. 1 cam to the last of the series. Thus when employed in connection with the adjustable block usually two and sometimes more of the same cams of the series are suitable for performing an operation by properly adjusting the block 312.

One fact of importance in connection with the cam system of our invention lies in the fact that all of the rise of any particular cam need not be employed. The connections between the selectors and the turret slide are made and broken within a constant interval of time, this interval being approximately that required to index the turret. In Fig. 7 the tool stop is in position and its corresponding selector 326 is being held in position by the roller 299''. As soon as the turret clutch is tripped, the cam member 263 starts to rotate, thereby breaking the toggle and moving it from the position shown in Fig. 7 to that shown in Fig. 6. The turret, however, does not start to index until substantially completely retracted. When the turret is in a substantially completely retracted position, the roller 199 (Fig. 5) enters one of the radial grooves 202 in the cam disk 203. The turret is then rapidly indexed and simultaneously the next roller 299'' is moved to properly position its corresponding selector 326.

It will be noted that the cam member 263 (Fig. 7) has a dwell 402 and while the roller 266 occupies this dwell, the turret is indexed and the next selector positioned. However, as soon as the disk 203 (Fig. 5) starts to rotate, the roller 299'' is moved out of position to hold its selector down (Fig. 7) and the connection between the turret slide and the cam 298 (Fig. 3) which corresponds to the tool stop 299' is broken and the cam 298 is no longer effective to control the slide. The next cam 299 then takes over control of the slide. The fact that the connections between the cams and the tool slide are successively broken and made, makes it unnecessary for the rollers or cam followers 396 to drop down to low points on the cams, as in the prior art machines (see Fig. 24). Each cam may be set to pick up so as to control the slide at any desired point on the rise and so as to finish on the high point of the cam.

When the roller 266 approaches the end of the dwell 402, the selector corresponding to the cam 299 is already in position and acts as a stop to limit the rearward movement of the toggle block 238 and thus position the point to which the tool is advanced with respect to the work prior to the commencement of the cutting operation. This point of advance of the tool is dictated by the amount of clearance desired between the end of the tool and the work so as to prevent the tool from jabbing into the end of the work. The point of advance is determined by the point on the cam 299 at which this cam becomes effective to control the slide and by the adjustment of the turnbuckle 317, as will be later described.

The fact that all of the rise of any particular cam need not be employed may be made clear by considering the operation shown in Fig. 22—4, the cam and adjustable block setting for which has been shown in Fig. 16. The whole rise desired for this operation (including clearance) is 1.17 inches in the time required (determined by allowable cutting speed) for the cam to rotate through 19.5 hundredths of a complete revolution. The amount of advance of the tool desired may be figured backward from the point 96. This, for example, in Fig. 16 may be the point 403. The cam 302 is set and the other parts of the machine are arranged so that connection of the cam 302 to the slide occurs just prior to the correponding roller riding on the cam 302 reaching the point 403.

The cam 302 is then effective to advance the slide during the cutting operation of the balanced turning tool 302' from the point 403 to the ninety-six one hundredths (.96) mark on the cam. In this instance no finishing is required and the connection is broken when the cam follower reaches the .96 mark. Should finishing be required, a few turns of the spindle may be allowed so that the connection between the cam 302 and the slide is not broken until, for example, the ninety-seven one hundredths (.97) mark is reached. This portion of the cam, as previously mentioned, is a dwell. Any desired extent of this dwell may be employed, depending upon the setting of the trip dogs on the trip dog carrier 135.

Thus, any portion of the rise of any cam may be employed and preferably the amount of desired rise is figured clockwise, as viewed in Fig. 16 from the mark .96. The cutting operation is preferably always completed on the high point of the cam and should the cam having the approximate rise desired not give the exact required rise, the previce advance of the tool desired may be obtained by shifting the adjustable block 312 along the cam segment 307. The block setting for the operation shown in Figs. 22—4 employing a No. 2 cam is with the reference point 401 set at the point of the cam segment approximating .96.

Adjustments of the point of advance of the tool prior to the cutting operation to allow for clearance in accordance with standard practices is made by adjusting the turnbuckle 317. It will be appreciated upon an examination of Figs. 7 and 16 that with a particular cam in position, which in the case of Fig. 7, is the cam 298, the position of the end of the tool 299' with respect to the work may be adjusted by adjusting the turnbuckle 317. Thus, if it is desired to decrease the length of stock protruding from the end of the spindle chuck, the turnbuckle 317 may be adjusted so as to lengthen the distance from the point 322 to the point 316. Lengthening of the turnbuckle moves the bell crank 289 in a counter-clockwise direction, as viewed in Fig. 7, and shifts the slide forwardly so as to decrease the distance between the end of the tool stop 298' and the face of the spindle chuck. Since the connection between each of the cams and each of the selectors is through an adjustable turnbuckle 317, the position of each tool with respect to the work may be adjusted individually.

The advantages of individual adjustment of the slide for each tool position of the turret, accomplished by the adjustable turnbuckles 317, will be perhaps more clear from a consideration of the prior art machines. In the prior art machines when the cam follower is on the high point of a given size of cam there is a definite least distance of the turret from the face of the chuck. In some of the prior art machines there is possible a small adjustment of this least distance by shifting the slide. Should this adjustment not give enough space to accommodate the length of the tools and permit them to finish their cut on the point desired, it is necessary to cut down the cams on some or all of the lobes.

After the position of the turret slide and the cut downs of the cam have been determined so as to accommodate all the tools, the individual tools are pulled out of their turret tool sockets, as shown at 405 in Fig. 25, far enough to reach the proper point on the piece when the cam follower is on the top of the corresponding lobe. Thus each tool must be individually adjusted in its socket with respect to the work. It is necessary for the operator to employ a scale and tap the tool back and forth until the proper tool position is reached. Since it is necessary for him to tap and adjust each tool, considerable time is wasted in setting up the machine in adjusting each tool with respect to the work.

In our machine, because of the individual turnbuckle adjustment, full diameter cams may always be employed. The tools finish their cuts with the cam followers or rolls 306 on the high points of the cams. The position to which each selector returns the slide after indexing, with a given cam setting, may be adjusted for each tool position of the turret. With the cams properly set to give the proper cutting advance (plus clearance), each tool may be adjusted so that the proper clearance exists between the tool and work prior to the commencement of the cutting advance. The tools are always bottomed in their turret tool sockets and adjustment of each individual tool with respect to the work is accomplished merely by adjusting the corresponding turnbuckle 317. The individual adjustment results in a considerable saving in the time required to set up the machine.

The arrangement of the machine enabling each of the tools to be at all times bottomed in its turret tool socket results in additional advantages. In order to compensate for the sharpening of tools during progress of a job it is necessary merely to adjust the turnbuckle to compensate for the decrease in length of the tool due to sharpening. Because in machines of the prior art the tools are not bottomed in their sockets, it is necessary when a tool has been resharpened, to again adjust the tool with respect to the work by tapping it into position as above described.

The operation and advantages of the machine of the present invention will be more clear from tracing through the operations required to make a particular piece and comparing the machine of the present invention with those of the prior art. In Fig. 21 we have shown a piece adapted to be made by the machine of our invention. The first operation is one of feeding stock and is illustrated in Fig. 22—1. The turret is then indexed and the centering and facing tool is brought into position, as shown in Fig. 22—2. The turret is then again indexed and the floating drill holder brought into position after which the hole is drilled, as illustrated in Fig. 23—3. The turret is again indexed and rough turned with the balanced turning tool, as illustrated in Fig. 22—4. Another rotation of the turret brings the box tool into position for the purpose of finish turning the piece, as illustrated in Fig. 22—5. The next operation, shown in Fig. 22—6, is performed by a circular form tool mounted on the front cross slide. When the front cross slide is operating the turret must be in a retracted position to permit the tools to clear. The seventh operation, one of threading, is shown in Fig. 22—7 and is performed by the last tool on the turret. After this operation is completed the turret is retracted and the circular cut off tool, mounted on the rear cross side, brought into position so as to cut off the finished piece and taper the next succeeding piece, as shown in Fig. 22—8.

In Fig. 23 we have shown a work sheet, such as might be employed for giving the machine operator the information required for properly setting up a prior art machine. The work sheet shown is slightly different from that conventionally employed so as to permit a more direct comparison with corresponding operations of the machine of our invention, shown in the work sheet of Fig. 26. In Fig. 24 a cam diagram for the machine of the prior art has been shown. The lead cam 411 is indicated by a solid line, the front cross slide cam 412 by a dot and dash line, and the rear cross slide cam 413 by a dash and double dot line. In accordance with conventional practices, these cams are shown on the cam sheet in superimposed true relationship with respect to each other. The corresponding cam sheet for the machine of our invention is shown in Fig. 27, the lead and cross slide cams being indicated by the same numerals employed in Fig. 3. As in Fig. 24, the lead cams have been superimposed with respect to the front and rear cross slide cams 154 and 153.

Because the practices employed in designing cams and setting up work sheets and cam sheets are well known in the art to which this invention applies, it is believed unnecessary to point out in detail how the figures for the work sheet and the cam lobes for the cam sheet are determined and developed. The principle employed in designing the cams of Fig. 24 is to find out the number of spindle revolutions required for each cutting operation and for each idle movement. Where possible operations are overlapped and the spindle revolutions are proportioned on the surface of the lead cam which is divided into hundredths so that the total of the spindle revolutions equals the full circumference of the cam. Lobes are developed to feed the tools into the work, the radial height or throw of which equals the length a particular tool will travel in performing its cutting operation on the work. The amount of cam surface occupied, with a given speed of rotation of the cam, governs the rate of feed of the tool. The lobes of the cam are connected by drops or rises and during these spaces idle movements take place. The cross slide cams revolve at the same rate of speed as the feed cam so that operations performed by the cross slide tools may be properly synchronized with the operations performed by the turret tools. When either the turret or cross slide tools are inactive, the corresponding portions of the cams are milled down so that the tools are withdrawn out of the way. A rise on the cam surface brings the inactive tool back into position to start an operation at the required time.

The first operation is that of feeding stock, as shown in Fig. 22—1. The stock is fed during rotation of the cam of Fig. 24 from the zero point to the line marking .7143 of the cam surface. This line and all other similar lines are determined more accurately in the drawings shown in Fig. 24, than it is necessary to determine them in practice. The portion of the cam from the zero point to .7143 is a dwell. After the stock feeding operation is completed the turret is indexed from .7143 to 2.2143, the position of the cam follower at the bottom of the drop required for indexing being indicated by the dotted circle 414. In the machine of our invention stock is fed while the cams rotate from the zero point to the line marked .8333. At the line .8333 the turret clutch 77 is tripped following which the cam 298 is disconnected from the slide, or the connection between the cam 298 and the slide is rendered inoperative or disabled. At the line marked 1.6666 the cam 299 is connected to the slide and the corresponding selector acts as a stop for the slide to position the centering and facing tool, shown in Fig. 22—2, in spaced relation with the work and preparatory to centering and facing the end of the piece. The cam follower of the cam 299 at the point it starts to advance the slide is indicated at 415.

It will be noted from a comparison of Figs. 23 and 26 that the stock feeding is accomplished in the same number of spindle revolutions, namely, five. The first indexing of the turret, however, requires 10.5 revolutions of the spindle in the case of the prior art machine, and only five revolutions with the machine of our invention. This is not due to the fact that one machine indexes faster than another, as both machines are assumed to index in the same length of time. In this particular case one quarter of a second may be taken as the indexing time for both machines.

It would be assumed that if the indexing mechanism operates at all times in one quarter of a second that the indexing operation must take place in exactly the same length of time on the same job or on different jobs. This is true in the case of the prior art machines on fast jobs as where a piece may be completed, for example, in eight or ten seconds. But as the number of seconds required to finish a piece increases, the lead cam of Fig. 24 revolves more slowly and a point is reached where the time required to index the turret (and in some cases also to feed stock) does not represent space enough on the cam circumference to permit the cam follower to drop to the required position to start the next operation. Therefore, while the actual time required for indexing the turret (or feeding the stock) is no greater, more cam circumference is required to permit the cam follower to drop to the proper position for starting the next operation than the actual time required for indexing. The cam surface available then becomes the factor governing time lost in indexing and in some cases in feeding stock.

The particular job illustrated is a relatively long job (sizes of the machines considered) requiring in the case of the prior art machine approximately thirty-five seconds to complete a piece. Hence the lead cam rotates so slowly that the cam follower does not have time to drop to the position shown at 414 in Fig. 24 within the time required for indexing. It will be understood that in accordance with practices well known in the art, the lines of drop in getting from the top of one lobe to the start of the next are made as steep as it is possible to make them without having the cam follower fall to the bottom of the drop.

Another factor which must be considered is that the centering and facing operation, because of the length of the tools involved and the location of the slide, must be started with the cam follower in the position shown at 414 in Fig. 24. Because the cam follower must be in the position shown for the start of the centering and facing operation the lead cam is cut down from its full height, as still more time would be lost if it were necessary for the cam follower to drop from the outer circumference of the cam to the position shown at 414.

Frequently when a cam cut down is required or the cam follower drops to an extremely low point, a problem is encountered in allowing sufficient space on the cam for the cam follower to reach its desired position. This will be appreciated when it is considered that the distance between spaced radii of the cam decreases from the circumference toward the center and the cam follower must lie in a depression between a drop and a rise. This frequently represents an additional loss of time on idle movements because it is necessary to allow sufficient room on the cam surface to accommodate the cam follower, the diameter of which in this case is one-half inch, about as small a roll as may be practicably employed. This results in the instant case in the cam outline being modified at the point 410 to accommodate the circumference of the roll. Because it is necessary to accommodate the follower, the succeeding rise to center and face must start later.

With the machine of our invention, by adjusting the turnbuckle 317 corresponding to the cam 298, the stock stop may be properly positioned so that the dwell, provided on each of the standard cams at the full height thereof, may be employed. Since the connections between the cams and the turret slide are broken and made in sequence and in a constant period of time, and because it is unnecessary for the cam follower to follow a line of drop, the indexing of the turret (also the feeding of stock) is always accomplished in the actual time required for the indexing mechanism to operate, namely, one-quarter of a second. Moreover, the problem mentioned above, of allowing enough room on the cam to accommodate the diameter of the follower, is not encountered, since no cam, when effective to control the slide, ever lies in a depression between a drop and a rise.

After the centering and facing operation has been completed, as illustrated in Fig. 22—2, the turret is again indexed between the line marked 8.2143 to the line marked 10.3393 (Fig. 24) and between the line marked 8.6666 and the line marked 9.4999 (Fig. 27). This indexing operation (Fig. 23) requires 14.875 spindle revolutions in the case of the prior art machine, and 5 spindle revolutions (Fig. 26) in the case of the machine of our invention. The cam follower illustrated at 416 (Fig. 27) is the follower which rides on the cam 299, while the cam follower illustrated at 417 is the cam follower which rides on the cam 301.

The operation of drilling a one-eighth inch hole in the end of the piece is illustrated in Fig. 22—3. This operation is completed at the line marked 18.5536 in Fig. 24, and at the line marked 19.0382 in Fig. 27. The turret is again indexed to bring the balanced turning tool into operation, a loss of time being again necessitated in connection with the prior art machine to permit the cam follower to drop from the position, illustrated at 418, to that shown at 419, and to allow room on the cam surface to accommodate the cam follower.

The cam follower illustrated at 421 (Fig. 27) is the cam follower 417 at the end of the drilling operation. The cam follower 422 is the cam follower which rides the cam 302 and is shown in position at the beginning of the rough turning operation. Since the rough turning and finishing operations (Figs. 22—4 and 22—5) are relatively long cuts, the turnbuckles 317 corresponding to the cams 302 and 303 must be adjusted so as to shorten the lengths of these turnbuckles so that these tools will have proper clearance space from the end of the work at the completion of the indexing operations and just prior to starting the cuts.

At the completion of the rough turning operation the cam follower in Fig. 24 occupies the position shown at 423. With the fastest line of drop 424 permissible without the roller falling to the bottom of its drop, the cam follower will be at the position 426 when indexing has been completed. This indexing operation requires, as shown in Fig. 23, 21 spindle revolutions for the cam follower to roll down the line 424, although the actual time of indexing is only one-quarter of a second. This time loss illustrates another factor of importance in connection with our machine.

Generally, in the prior art machines, when the amount of cam surface available governs the time of indexing, it is necessary for the operator to take considerable care in setting the trip dog which operates the turret clutch, because the actual operation of the indexing mechanism can not start more than one-fourth second before the cam follower reaches the point 426. This is accomplished by setting the trip dog back or, in other words, having it trip the clutch late. Thus the trip dog, in accomplishing the indexing between the lines 37.3929 and 40.3929, is not set to trip the clutch at the point indicated by the position of the cam follower at 423. Instead the trip dog is set to trip the clutch when the cam follower is almost in the position shown at 426. The cam follower must be at the bottom of the drop (at 426) upon the completion of indexing. This requires some skill and time in setting the trip dog while the machine is operated by means of the hand wheel until, by adjusting the position of the dog on its carrier, the clutch is tripped at precisely the right point.

This, as will be appreciated, causes the balance turning tool, in being retracted from the position shown in Fig. 22—4, to be withdrawn from the work slowly; that is, approximately sixteen revolutions of the spindle occur while the balance turning tool is moving over the surface of the work and before the indexing mechanism operates. No such fine adjustment is required with the machine of our invention. The trip dogs may be set to trip the clutch at definite, easily determined points. The tools, at the completion of cuts, are withdrawn from the work rapidly and by the indexing mechanism. Notwithstanding a fact that the tool has just completed a long rise, as compared to the rise required for the centering and facing operation, the indexing time remains the same. In the prior art machines the total idle time necessitated when indexing may vary (compare the time of indexing after operation 2 with that after operation 4, Fig. 23).

At the line marked 57.1072 (Fig. 24) and at the line marked 59.7498 (Fig. 27) the finish turning operation illustrated in Fig. 22—5 is completed. The next operation is a forming operation performed by the front cross slide tool. This introduces the problem of tool clearance. To avoid loss of time it is desirable, of course, that the cross slide tools start to cut as soon as possible after the turret tools have finished their work. In work turned close up to the chuck, and particularly where cam surface governs the time of indexing, there must be time enough allowed to permit the turret tool to drop back out of the way before the cross slide tools are advanced. This is illustrated in Figs. 22—5 and 22—6.

The circular form tool used in performing the operation illustrated in Fig. 22—6 is shown in its approximate rest position in Fig. 22—5 at 431. The box tool shown at 432 must be withdrawn from the piece before the forming tool may be brought into cutting position. As previously mentioned in connection with the description of the retraction of the balance turning tool, approximately 16 spindle revolutions must elapse before the box tool is completely withdrawn from the work. During this retraction and while the cam follower rolls down the line of drop 433, the front cross slide tool can not be advanced, as above mentioned. Rather complicated methods are employed in connection with the prior art machines for determining the clearances required, all of which adds to the time required to design the cams and set up the machine.

Moreover, time is lost in advancing the front cross slide into cutting position. The rise required on the front cross slide to bring the forming tool into cutting position is illustrated at 434. This rise is made as steep as possible while still avoiding "hooking" of the front cross slide cam follower, a term well understood in the art to which this invention applies. The necessity of avoiding "hooking" of the front cross slide cam follower introduces an additional time loss factor, resulting in a total loss of 45.5 revolutions of the spindle (see Fig. 23) between the time the tool finishes its cutting operation and the circular form tool commences its cutting operation.

With the machine of our invention the idle time between the cutting operations of these tools is still the minimum required to index the turret, five spindle revolutions. The time required to advance or retract either of the cross slides may be, for example, one-eighth of a second. As previously described in connection with Fig. 2, the front and rear cross slides are brought into a position ready to cut by straightening out toggles 352, 353 and 369 and 371. The action is a rapid one and not dictated by the necessity of a cam follower rolling over a cam outline. Thus, for example, the trip dogs on the carrier 134 may be set to trip the front cross slide clutch 83 (Fig. 3) almost immediately following the actuation of the turret clutch 77. Thus within a constant interval of one-quarter second the box tool is retracted and the circular form tool brought into the cutting position shown in Fig. 22—6. It will be understood that, as in all operations, the cam 154 is set to pick up and start the cutting operation at such point as to finish the forming operation at the ninety-six hundred mark (see Fig. 16).

In Fig. 27 the cam follower of the cam 303 is represented by the circle 436, while the cam follower of the front cross slide cam 154 is represented by the circle 437. At the termination of the front cross slide forming operation a dwell is provided, as indicated in Fig. 24, between the lines marked 69.25 and 69.6785 and, in Fig. 27, between the lines marked 67.1665 and 67.6665.

The front cross slide is then retracted and the spindle reversed and the speed changed to 400 revolutions per minute. As in all operations in connection with the prior art machine, the front cross slide cam follower must follow the cam during retraction and, to prevent its falling to the bottom, a line of drop 438 is provided. This, together with a loss of time resulting from the necessity of allowing for tool clearance between the front cross slide forming tool and the releasing die holder, results in idle time equivalent to 10.2515 spindle revolutions as compared with 2.5 spindle revolutions.

The threading operation, as indicated in Figs. 22–27, is then performed, which is completed in the prior art machine at the line marked 80.1430 and in the machine of the instant application at the line marked 78.5831. Since the releasing die holder feeds itself on the work the cam follower is shown off the cam, as indicated by the circle 439, in Fig. 24, and 441, in Fig. 27.

At the line marked 80.1430 (Fig. 24) the spindle is reversed automatically and the speed changed back to 1200 R. P. M., the releasing die holder is retracted and the rear slide is advanced to perform the cutting off operation which commences at the line marked 83.1430. Again in connection with the advance of the cutting off tool, the line of rise, as indicated by the numeral 442, must be gradual to avoid "hooking," resulting, in this instance, in no loss of time because in the case of both machines the rear cross slide may be advanced so as to commence its operation at the completion of the threading off operation. The threading and cutting off operations have been overlapped slightly and could be possibly overlapped to a greater extent. However, the overlapping could be the same in both machines so that the operation shown gives a direct comparison of the two machines.

The cutting off operation commences at the line marked 83.1430 and is completed at the line marked 98.1429 including a dwell of three revolutions, as indicated in Fig. 24. Cut off begins at the line marked 82.0831 and is completed at the line marked 98.5831, including three spindle revolutions for dwell of the cut off tool, in the case of the machine of Fig. 27.

As shown in Fig. 24, the cam follower indicated at 443 must follow a line of drop, 444, resulting in a loss of time, before the stock feeding operation may commence, equal to 12.9697 spindle revolutions, as shown in Fig. 23. Because, in connection with the machine of our invention, a quick return of the rear cross slide is provided, no loss of time results except the actual one-eighth of a second required for retracting the rear cross slide.

As previously mentioned, no attempt in actual practice would be made to lay out the cams in the accurate manner specified above. The operations above described are theoretical. However, an analysis of the operations of the two machines shows an important saving in time which would be materially increased if the necessary allowances were made for cam follower clearance in connection with the machine of Fig. 27. This cam follower clearance has not been taken into account as the machines have been considered to operate on a theoretical basis and because the amount of clearance allowed, to a certain extent, depends upon the cam designer.

As shown in Figs. 23 and 26, a saving of idle time of approximately one hundred spindle revolutions results, thus decreasing the time required to make the same piece from thirty-five to thirty seconds. The gross production per hour is increased from 102 pieces to 120 pieces. While the same percentage increase in production would not necessarily be true in the case of the production of all pieces for which the machines are adapted, at least some increase in production it is believed would result in all cases. This time saving would be further materially increased by including the time required to lay out and machine the cams of the machine of the prior art, set up the machines and set the tools in the turret sockets as described above.

The lead cams may be mounted and set with respect to each other on the lead cam shaft in any suitable manner, but we prefer to employ the construction and arrangement shown in Figs. 17 to 20, inclusive. The lead cam shaft, generally indicated by the numeral 122, Fig. 3, comprises, as shown in Fig. 17, a shaft section 461 and a shaft section 462. The shaft section 461 is substantially cylindrical throughout most of its length, and has a threaded portion of reduced diameter at 463 and a head as shown at 464. The shaft section 462 has a flange part 466 and a sleeve part 467. The shaft section 462 is bored, as indicated at 468, and has a portion 469 of reduced diameter threaded to receive the threaded portion 463 of the shaft section 461.

A longitudinally extending key slot 471 is provided on the outer circumference of the shaft section 461 adapted to receive a key 472 for holding the worm wheel of the worm gear assembly 121 in position. The outer end of the shaft section is threaded, as shown at 473, for the reception of a nut 474 for holding the parts in position. A sleeve 476, loose with respect to the shaft section 461 and concentric therewith, has a longitudinally extending key slot 477 in which a key 478 is rigidly held in position, as indicated at 479. One end of the sleeve 476 is flanged, as indicated at 481, and provided with a spanner wrench opening as indicated at 480. The other end of the sleeve 476 is threaded, as shown at 482, for the reception of a nut 483.

A collar 484 has a flanged part 486 and is mounted on the shaft section 461. The cam assembly is supported from the machine frame, as shown at 487. Bearing assemblies 488 are mounted in the frame and rotatably support the lead cam shaft. One race of the bearing assemblies rotates with the collar 484 and two with the shaft section 462, while the other races of the bearing assemblies are stationary. The collar 484 is provided at the peripheral portion of the flange 486 with a pair of notches 489 for the reception of a pair of projections 491 provided on a collar 492. The flanged portion 481 of the sleeve 476 is similarly provided with a pair of projections 493 which are adapted to fit in notches 494 provided in the flange portion 466 of the shaft section 462.

The collar 492 is provided with a taper 496 and this tapered portion, together with a series of tapered collars 497, are adapted to receive the cams 298, 299, 301, 302, 303 and 304 and hold them in proper spaced relation. The bore of the cams is tapered, as shown at 498, to correspond with the taper of the collars 492 and 497. Each of the collars 492 and 497 is provided with a key slot 499 for reception upon the key 478. The collars are thus fixed against rotation on the shaft while the cams may be shifted with respect to the collars. When the assembly is tightened the tapered parts of the collars and cams prevent the cams from shifting.

Assuming the parts are in the position shown in Fig. 17 and it is desired to disassemble the cam unit for setting up a new job, the shaft section 461 is first removed by unthreading it from the shaft section 462. The collar 484 is then moved slightly to the left, as viewed in Fig. 17, after which the cam assembly, shown in Fig. 18, may be bodily removed as a unit by lifting the projections 491 and 493 out of their cooperating notches 489 and 494. After the cam assembly shown in Fig. 18 has been removed the nut 483 is unthreaded, which releases the collars 492 and 497 and the cams.

In assembling and setting the cams on the sleeve 476 the sleeve 476 may be fitted in a fixture (not shown). The fixture may comprise a fixed section which is suitably calibrated and a rotatable section on the upper face of which may be provided a pair of grooves for the reception of the projections 493. The rotatable section of the fixture may be provided with an arrow adapted to register with the calibrations on the fixed section.

After selecting the cams suitable for the job to be accomplished the cams and collars are fitted on the sleeve 476. With the cams loose on their tapered collars and the sleeve 476 in the fixture above mentioned the cams may be adjusted to position them properly, as indicated in the cam diagram shown in Fig. 27. Any desired method may be employed in setting the cams with the fixture above mentioned so that the cam high points are in proper staggered relation. When the cams are properly positioned the nut 483 is tightened and due to the taper on the cams and the tapered collars the cams are held rigidly locked with respect to each other.

When the cams are assembled on the sleeve as shown in Fig. 18, the cam assembly may be inserted by registering the notches and projections 489, 491, and 493, 494. Preferably these notches and projections are offset as shown so that the cam assembly can not be improperly inserted. The shaft section 461 is then threaded into position and tightened. One factor of importance is that at any time a cam or cams can be quickly adjusted or replaced by a different cam or cams should an error in the setting or selection of cams be made, or should it be desired to change a particular tool operation in either length or duration of cut. Thus, for example, should it be found, as a job progresses, that any particular operation can be speeded up, the cam setting can be quickly changed to take advantage of this possible speed up. Thus the machine is extremely flexible and may be adapted to substantially any set of conditions without appreciable expense or delay.

Quite frequently not all of the tool positions of the horizontal turret are required in making a particularly piece. If, for example, a tool stop and only three cutting tools are necessary in performing a particular job, any cam may be rendered ineffective to advance the slide. Should a particular tool position not be employed the lead cam shaft is nevertheless filled with cams and collars to maintain the proper spacing between the cams. The turnbuckles 317 of a particular cam or cams which are not to be effective are shortened to substantially the maximum extent possible which withdraws or retracts the corresponding selectors and prevents them from actuating the slide.

Under such conditions the toggle of the slide will be straightened out by reason of the continued rotation of the turret clutch. However, due to the fact that the selector is not in a position to limit the rearward movement of the toggle block, the straightening of the toggle will primarily push the toggle block rearwardly, as viewed in Fig. 6, and not advance the turret to an extent sufficient to interfere with work which the cross slides may be performing. Should a particular tool position of the turret not be employed as, for example, the tool position 304', it will, of course, be necessary to index the turret twice following the operation performed by the tool 303' in order to position the stock stop for starting operations on the next piece. This is accomplished by properly setting the trip dogs on the trip dog carrier 136 to operate the turret clutch twice after the operation performed by the tool 303' is completed.

The vertical turret may be provided as a permanent part of the machine or may be an attachment therefor, as desired. As previously mentioned, referring to Fig. 3, the vertical turret is driven from the shaft 73. The shaft 73 (Fig. 2) has a clutch 511 mounted thereon, the clutch element 510 of which is loose with respect to the shaft. The clutch is engaged and disengaged by a lever 512 pivoted on the rod 374. The lever 512 extends downward and has its lowermost end pivoted as shown at 513 to a link 514. The link 514 is pivoted, as shown at 516, to a bell crank 517 pivoted as indicated at 518. The bell crank 517 has the trip dogs 145 mounted on its forward end which are adapted to be engaged by trip dogs on the trip dog carrier 133. A stop lever for the clutch 511 similar to the stop lever described in connection with the horizontal turret clutch may be provided.

Upon engagement of the clutch 511 cam element 519 is driven. The cam element 519 has a cam groove 521 adapted to receive a roller 522 mounted on the end of a bell crank 523. The bell crank 523 is pivoted on a rod 524 and has pivoted at the end thereof, as shown at 526, a link 527. The link 527 is adapted to actuate a toggle 528. One arm 529 of the toggle 528 is pivoted, as shown at 531, to a slide 530 for the vertical turret, indicated generally at 532. The other arm 533 of the toggle 528 is pivoted, as shown at 534, to a lever 536 fulcrumed at 537. The lever 536 has a bracket 538 secured to the end thereof, which is provided with a series of slots 539, in this case five in number.

The slots are adapted to receive long levers 541 each of which is pivoted separately, as indicated at 542, to one of a series of arms 543. The arms 543 are free to pivot on the rod 359. Pivoted, as indicated at 544, to each of the arms is a link 546 each of which in turn is pivoted to a block, indicated in dotted lines in Fig. 2 at 547.

The five long levers 541, together with their associated parts, are shown also in Fig. 1. It will be appreciated that, as in the case of the horizontal turret, each of the cams of the cam assembly 152 is adapted to actuate a cam segment 550 on which one of the adjustable blocks 547 is mounted. Actuation of the cam segments actuates the long levers 541 which swing the lever 536 about the fulcrum 537. Each of the long levers 541 is provided with a spring 548 which normally holds the lever out of position.

The levers are moved into position against the action of springs 548 by a Geneva motion assembly similar in most respects to the Geneva motion assembly for the horizontal turret. That is, a plurality of cam disks are provided, each of which carries roller 551. The rollers on the cam disks are spaced 72° apart and the whole disk assembly is rotated intermittently by a Geneva motion and eccentric similar in construction and operation to the Geneva motion 201, 203 shown in Fig. 5.

The disk assembly upon which the rollers 551 are mounted may be driven by gears 553 and bevel gear 554. The gearing 553 is mounted in a housing shown at 552 in Fig. 1. The bevel gear 554, as shown more clearly in Fig. 1, is mounted on a shaft 555. The bevel gear 554 is driven by a bevel gear 556 mounted on a shaft 557 provided with suitable bearings. On the other end of the shaft 557 a bevel gear 558 is mounted which meshes with a bevel gear 559. It will now be clear that rotation of the bevel gear 559 rotates the rollers 551.

The bevel gear 559 is mounted on a substantially vertically extending shaft 561 which is suitably journaled and has secured thereto a gear 562. The gear 562 meshes with a gear 563 mounted on a lay shaft 564. The lay shaft 564 has a disk 566 mounted thereon which is provided with five radial slots. The slots are adapted to receive a roller 567 mounted on a crank 568 secured to a collar 569 which is rotated whenever the clutch 511 is engaged. The Geneva motion comprising the roller 567 and the disk 566 corresponds to the Geneva motion 201, 203 for the horizontal turret. Upon actuation of the clutch 511 the lay shaft 564 is rotated through 72°.

The vertical turret assembly is essentially the same in all its functions and operations as the horizontal turret, the primary exception being that the clutch 511 is a half revolution clutch instead of a full revolution clutch. Upon engagement of the clutch 511 the toggle 528 is straightened to advance the tools mounted in the vertical turret 532 with respect to the work. One of the cams of the cam assembly 152 then advances the turret to perform a cutting operation. At the completion of the cutting operation the clutch 511 is tripped again, by properly setting a trip dog on the carrier 133, after which the toggle is broken to withdraw the vertical turret. The turret 532 is then indexed by suitable mechanism driven from the Geneva motion 566, 567 to bring another tool into effective position.

The only other essential difference between the vertical and horizontal turrets lies in the fact that, for the turnbuckles 317, there is substituted another type of adjustment comprising the threaded members 571. The function of the threaded members 571 is, however, the same as the turnbuckles 317. By adjusting the threaded members 571 (Fig. 1), the position of the lever 536, when each long lever 541 is in effective position, is adjusted so as to properly position the turret at the desired point at which the cutting advance of the vertical turret should occur. Thus the position to which the turret is advanced may be individually adjusted for each tool position of the turret. It will be appreciated that the long levers 541 are moved into and out of effective position by the rollers 551, and the springs 548.

As in the case of the horizontal turret the effective advance of the tools mounted in the vertical turret may be individually adjusted by properly setting the adjustable blocks 547 in their corresponding cam segments. Since the cam assembly 152 for the vertical turret is driven at the same speed as the cam assembly 123 for the horizontal turret and at the same speed as the front and rear cross slide cams 153 and 154, it will be appreciated that the operations of the vertical turret may be coordinated with those of the horizontal turret and front and rear cross slides.

The front and rear cross slide cams 153 and 154 and the vertical turret cams are removable from the cross slide cam shaft 129 as a unit and in substantially the same manner as the horizontal turret cam assembly. A stop 576 may be provided for the vertical turret, similar to the stops for the horizontal turret and front and rear cross slides, to insure positive withdrawal of the vertical turret tools. The cams for the vertical turret are interchangeable with and are part of the same series as the cams for the horizontal turret and front and rear cross slides. Where a vertical turret is not desired, all the parts of the vertical turret may be easily removed from the machine, although it is desirable that the bevel gear 71 (Fig. 3) be furnished whether a vertical turret is desired or not.

It will be appreciated that the invention provides a machine which is extremely flexible in operation, may be "set up" with a minimum of lost time, and a machine which is capable of producing machined parts faster and more economically. While the preferred form of the machine of the invention has been shown and described, it will be understood that various features of the machine may be used without other elements thereof and that many changes and modifications will suggest themselves to those skilled in the art, without departing from the spirit of the invention as set forth in the appended claims.

We claim:

1. In an automatic forming machine having a multiple tool support movable to carry said tools individually into and out of operative engagement with the work to be formed, means for moving said support comprising a plurality of timing elements, a plurality of separate connections between said elements and said support, respectively, each of said connections being movable independently of each of said other connections, means for sequentially making and breaking said connections, and means for actuating said elements.

2. In an automatic forming machine having a multiple tool support movable to carry said tools individually into and out of operative engagement with the work to be formed, means for retracting said support, means for advancing said support comprising a plurality of timing elements, a plurality of actuating connections between said elements and said support, each of said connections being movable independently of others of said connections, means for sequentially making and breaking said connections, and means for actuating said elements.

3. In an automatic forming machine having a multiple tool support movable to carry said tools individually into and out of operative engagement with the work to be formed, means for moving said support comprising a plurality of cams, a plurality of separate connections between said cams and said support, respectively, each adapted to be made and broken independently of the other connections, means for making and breaking said connections sequentially at time intervals independent of the lengths of the contours of said cams, and means for rotating said cams.

4. In an automatic forming machine having a multiple tool support movable to carry said tools individually into and out of operative engagement with the work to be formed, means for moving said support comprising a plurality of cams, a plurality of separate actuating connections between said cams and support each including an arm movable into and out of engagement with said support, means for moving said arms into and out of engagement independently of one another to render said cams effective sequentially at time intervals independent of the lengths of the contours of said cams, and means for rotating said cams.

5. In an automatic forming machine having a multiple tool support movable to carry said tools individually into and out of operative engagement with the work to be formed, means for moving said support comprising a plurality of cams, a plurality of actuating connections between said cams and said support, each of said connections including a bell crank actuated by said cam and an arm pivoted to said bell crank, means for moving said arms independently of one another into and out of actuating engagement with said support to render said cams effective at predetermined sequential intervals, and means for rotating said cams.

6. In an automatic forming machine, in combination, a support for a plurality of tools, said support having a bearing part, means for retracting said support, means for advancing said support comprising a plurality of timing elements and a plurality of separate actuators cooperating independently of each other with said timing elements, respectively, and successively engageable with said bearing part to successively advance the support, means for moving said actuators into and out of engagement with said bearing part, and means for actuating said timing elements.

7. In an automatic forming machine, in combination, a support for a plurality of tools, means for advancing said support comprising a plurality of timing elements and a plurality of separate actuators between said timing elements and said support, respectively, means independent of the advancing means for retracting said support after each advancement thereof, and means independent of said advancing means for connecting said actuators, individually and selectively, with said support while said support is retracted.

8. In an automatic forming machine, in combination, a movable support for a plurality of tools, means for retracting said support, a plurality of cams, a separate connection between each of said cams and said support for successively advancing said support, and means for making and breaking said connections operating independently of the actuation of said connections by said cams.

9. In an automatic forming machine, in combination, a turret having a plurality of tool positions, a movable support for said turret, means for advancing said support to bring the tools successively into operative position with respect to the work, said means including a plurality of cams and an independent connection between each of said cams and said support, means for retracting said support independently of said connections, means for indexing the turret when in a retracted position, and means for successively making and breaking said connections to successively render the cams effective to control the advance of said support.

10. In an automatic forming machine, in combination, a support for a plurality of tools, means for advancing said support including a plurality of control elements and an independent connection between each of said control elements and said support, means for retracting the support, means for breaking one of said connections and establishing another of said connections, and means for maintaining the time interval constant between the breaking of one of said connections and the establishment of another.

11. In an automatic forming machine, in combination, a work support, a rotatable turret having tool sockets in which the tools may be always bottomed, means for retracting and indexing the turret, means including cam means for advancing the turret to bring the tools into predetermined spaced relation with the work preparatory to a cutting operation, means for advancing the turret during cutting operation on the work comprising a plurality of tool feeding cams and a separate connection between each of said cams and said turret and means for varying said spaced relation of each of said tools individually and independently of others of said tools between successive indexings of the turret while maintaining the contour of the first mentioned cam means the same and while maintaining the tools in their bottomed position in the turret.

12. In an automatic forming machine, in combination, a work support, a turret having a plurality of sockets in which the tools may be always bottomed, a movable support for said turret, means for advancing the turret support comprising a plurality of cams and an independent connection between each of said cams and said support, means for retracting the turret support, means for indexing the turret when the turret support is in a retracted position, and means in each of said connections for adjusting the position to which the turret support is advanced for each tool position of the turret and independently of the position to which the turret support is advanced for other tool positions of the turret.

13. In an automatic forming machine, in combination, a spindle rotatable about a fixed axis for supporting the work, a support for a plurality of tools, means for moving the support so as to bring the tools successively into operative position, means including a separate cam and a separate connection between said cam and tool support for each of said plurality of tools for advancing the tool support as each of said tools is brought to operative position so as to perform a cutting operation on the work, and means for varying the amount of advance of the tool support by each cam independently of the other cams without changing the contour of said cam.

14. In an automatic forming machine, in combination, a support for a plurality of tools, positioning means for retracting and advancing the support to a predetermined position with respect to the work prior to performing cutting operations, feeding means including a plurality of cams for moving said support to feed said tools for cutting operations on the work, each of said cams having a rise, means for rotating said cams, and clutch controlled mechanism for connecting said support selectively and successively with the cams of said feeding means during a predetermined portion only of the rise of each of said cams for rapidly controlling the feeding movement of said tools.

15. In an automatic forming machine, in combination, a support for a plurality of different tools, means for indexing said support for presenting said tools successively to the work for performing successive different cutting operations comprising cam means having a plurality of lobes, each of said lobes having a rise and a high point and all of the high points of the lobes being substantially equidistant from the axis of said cam means, and means including separate connections between said cam lobes and said support, respectively, said connections being adjustable independently of one another for individually adjusting the position to which each tool is brought prior to cutting so that each feeding operation terminates substantially on the high point of a lobe.

16. In an automatic forming machine, in combination, a work support, a turret having a plurality of sockets in which the tools may be always bottomed, a movable support for said turret, means for advancing the turret support comprising a plurality of cams and an independent connection between each of said cams and said support, means for retracting the turret support, means for indexing the turret when the turret support is in a retracted position, means in each of said connections for adjusting the position to which the turret support is advanced for each tool position of the turret and independently of the position to which the turret support is advanced for other tool positions of the turret, and means for breaking and making said connections sequentially.

17. In an automatic forming machine, in combination, a spindle rotatable about a fixed axis for supporting the work, a support for a plurality of tools, means for moving the support so as to bring the tools successively into position to perform successive operations on the work, means including a plurality of cams and a plurality of separate connections between said tool support and said cams, respectively, for successively advancing the tool support so as to perform cutting operations on the work, means in each of said connections, adjustable independently of one another, for varying the amount of advance of the tool support, and means for sequentially making and breaking said connections for successively advancing said tools.

18. In an automatic forming machine, in combination, a support for the work, a turret having a plurality of tool positions, means for retracting, indexing and advancing the turret so as to bring the tools into a predetermined relation successively with the work preparatory to performing cutting operations, means for advancing the turret to perform successive cutting operations, said means including a plurality of cams and a cam thrown connection between each of said cams and the turret, means for adjusting the throw of each of said connections independently of the others and without changing the contour of said cams, and means for making and breaking said connections sequentially to advance the turret successively through different distances.

19. In an automatic forming machine, in combination, a support for the work, a turret having a plurality of tool positions, means for retracting, indexing and advancing the turret so as to bring the tools into predetermined positions successively with the work prior to performing successive cutting operations, means for further advancing the turret to perform cutting operations, said means including cam means and cam thrown connections between said cam means and said turret, means for adjusting the throw of said connections without changing the contour of said cam means, means in said connections for adjusting said predetermined position of each tool with respect to the work separately from the others, and means for making and breaking said connections sequentially to advance the turret successively through different distances.

20. In an automatic forming machine in which a single spindle is rotated about a fixed axis a turret having mounted therein a plurality of different tools adapted to be successively presented to the work for performing cutting operations, a movable support for the turret, means including an automatically disconnected constant speed member for retracting the support, means for indexing the turret when the support is in a retracted position, means including said constant speed member for advancing the support so as to bring the turret into a predetermined relation with respect to the support prior to performing cutting operations, said advancing means also including a plurality of cams and an independent cam thrown connection between each cam and the support, means for breaking said connections to enable the support to be retracted independently of the advancing means, means for making one of said connections to enable the advancing means to advance the support, said connections being broken and made sequentially so that each cam is effective to advance the support with the turret in one tool position, and means in each of said connections for varying the position to which the support is advanced for each tool position of the turret independently of the position to which the support is advanced for other tool positions of the turret.

21. In an automatic forming machine, in combination, a work support rotatable about a fixed axis, a multiple tool support, means for indexing said tool support, means including a plurality of cams and a separate connection between each cam and the tool support for advancing the tool support, means for retracting the tool support independently of the control of said cams, means for making and breaking said connections individually for shifting the control of said support selectively from one of said cams to another thereof, and means for adjusting said connections independently of one another to vary the amount of advance of said tool support for each tool, each of said connections including a pivoted element arranged to be actuated by said cam and a member adjustably positioned on said pivoted element.

22. In an automatic forming machine having a work support and a multiple tool support movable to carry said tools individually into and out of operative engagement with the work to be formed, a feed cam, a pivoted lever actuated by said cam, a part movably connected to said lever for adjustment radially thereon to vary the amplitude of movement of said part, a pivoted bell crank lever, a connection of adjustable length between one arm of said lever and said part, a selector pivoted to the other arm of said bell crank lever, actuating means connected with said tool support, and means for pivotally moving said selector to and from position for engagement with said actuating means for moving the same and actuating said tool support.

23. In an automatic work forming machine of the type having a multiple tool turret, a movable support for said turret, operating means for rapidly advancing and retracting said support between cutting engagements of said tools with the work, and means for indexing said turret while in retracted position, the combination of a plurality of cams for feeding said tools respectively, a plurality of separate selectors actuated by said cams, respectively, control means for moving said selectors individually and successively into cooperative relation with said support, each succeeding selector being moved into said cooperative relation before the preceding selector is moved out of cooperative relation, means for actuating said control means and means for rotating said cams.

24. In an automatic work forming machine of the type having a multiple tool turret, a movable support for said turret, operating means for rapidly advancing and retracting said support between cutting engagements of said tools with the work, and means for indexing said turret while in retracted position, the combination of a plurality of feed cams, one for each of said tools, a plurality of pivoted levers oscillated by said cams, respectively, a part movably secured to each of said levers for adjustment radially thereof to control the extent of movement of said part by said cam, a pivoted bell crank lever for each of said parts having a link of adjustable length pivoted to one of the arms of said bell crank lever and to said part, a selector bar pivoted to the other arm of each of said bell crank levers, means for sequentially moving said bars to and from position for actuating engagement with said operating means, and means for rotating said cams.

FREDERICK G. SILVA.
EDITH E. DAVENPORT,
*Executrix of the Estate of William S. Davenport, Deceased.*